United States Patent [19]

Fechalos

[11] Patent Number: 4,737,950
[45] Date of Patent: Apr. 12, 1988

[54] MULTIFUNCTION BUS TO USER DEVICE INTERFACE CIRCUIT

[75] Inventor: William A. Fechalos, Naperville, Ill.

[73] Assignee: Rockwell International Corp., El Segundo, Calif.

[21] Appl. No.: 739,941

[22] Filed: May 31, 1985

[51] Int. Cl.[4] .................... H04Q 11/00; H04Q 11/04; H04J 3/02
[52] U.S. Cl. ........................ 370/56; 370/60; 370/85
[58] Field of Search ............ 370/60, 94, 56, 85, 370/58

[56] References Cited
U.S. PATENT DOCUMENTS

| 4,408,323 | 10/1983 | Montgomery | 370/58 |
| 4,486,878 | 12/1984 | Havermans | 370/60 |
| 4,525,830 | 6/1985 | Cotten et al. | 370/56 |
| 4,542,501 | 9/1985 | Chevalet et al. | 370/85 |

Primary Examiner—Douglas W. Olms
Assistant Examiner—Curtis Kuntz
Attorney, Agent, or Firm—C. B. Patti; V. Lawrence Sewell; H. Fredrick Hamann

[57] ABSTRACT

A multifunction bus to user device interface circuit interfaces a user device having an adjunct processing unit and transmit and receive lines with a multi-function bus having predetermined channels and control time slots. The interface circuit has an internal processor for controlling data flow and is connected to the adjunct processing unit through an internal interface means for communicating control, address and data signals. A serial connection memory for channel selection is operatively connected to the internal processor as well as a parallel connection memory for channel selection. An I/O port interfaces the control time slots on the multifunction bus and is operatively connected to the internal processor. The multi-function bus interface means provides for communicating with the channel of the multi-function bus.

6 Claims, 29 Drawing Sheets

CONTROL COMMAND TABLE

| FROM CPU TO INTERFACE | FROM INTERFACE TO CPU |
|---|---|
| 1. Connect Time Slot | 1. Request for Service |
| 2. Ring | 2. Flash |
| 3. Ring Distinctive | 3. Answer |
| 4. Trip Ring | 4. Digit Received |
| 5. Release | 5. Busy |
| 6. Seize | 6. Out of Service |
| 7. Answer | |
| 8. Register Attached | |
| 9. Set Pad | |
| 10. Test | |
| 11. Dial | |
| 12. Put In Service | |
| 13. Put Out of Service | |

MULTIFUNCTION BUS TO USER DEVICE INTERFACE CIRCUIT

BACKGROUND OF THE INVENTION

The present invention relates in general to a network interface LSI for use in an improved switching system and, in particular, to a network interface LSI for use in an improved switching system capable of assuming a plurality of personalities and capable of supporting a variety of user services such as voice, data and video information.

Numerous computer controlled devices are known in the prior art which interface with user devices such as analog and digital telephones, user work stations, key system instruments, local area networks, and remote subscribers. Typically, such devices are custom designed to operate with specified user equipment.

Considering the present environment of different used equipment and the rapidly changing need for extended services, there exists a demand for an interfacing system which is flexible enough to service any of the variety of services. The system must be able to function as a stand-alone switching system or interface whatever the user equipment is with a host switching system, such as an automatic call distributor, tandem switch, PBX or concentrator. Such a system does not presently exist in the prior art, and prior art switching systems are not capable of assuming multiple personalities extending from small size to very large and are not able to adapt to varying demands for bandwidth and control in the present market.

Thus, there is a need for a device, such as a network interface LSI, which can function in a switching system capable of assuming different personalities depending on the application.

The present invention overcomes these deficiencies in the prior art.

OBJECTS OF THE INVENTION

It is the primary object of the present invention to provide a novel network interface LSI device for use with switching systems in either a stand-alone mode or interfacing host switching systems with a variety of user equipment.

It is another object of the present invention to provide a network interface LSI which can support two serial transmit and three serial receive ports in addition to two parallel transmit, four parallel receive ports.

It is a further object of the present invention to provide a network interface LSI which has an eight bit parallel control port for an adjunct processor.

It is yet another object of the present invention to provide a network interface LSI which can support 32 kb compressed voice transmission of bandwidths up to 1.536 mb.

It is a further object of the present invention to provide a network interface LSI which is economical to manufacture.

SUMMARY OF THE INVENTION

The present invention involves a network interface LSI for use in interfacing the user interface device having an adjunct processing unit and transmit and receive lines with a multi-function bus having predetermined channels and control time slots. The network interface LSI has an internal processor for controlling data flow in the LSI and is operatively connected to the adjunct processing unit through an internal interface means for communicating control, address and data signals. A serial connection memory for channel selection is operatively connected to the internal processor as well as parallel connection memory for channel selection. An I/O port interfaces the control time slots on the multifunction bus and is operatively connected to the internal processor. The multi-function bus interface means provides for communicating with the channels of the multi-function bus. A serial multiplexer allows read and write access to the serial connection memory and is operatively connected to the serial connection memory, to the user interface device transmit and receive lines, and to the multi-function bus interface. Similarly, a parallel multiplexer allows for read and write access to the parallel connection memory and is operatively connected to the parallel connection memory, to the user interface device transmit and receive lines, and to the multi-function bus interface. A clock means for receiving a predetermined fixed external clock signal and a reset signal for synchronization is operatively connected to the internal processor. It receives predetermined clock frequencies from the internal processor and output internal clock signals and strobe signals to the serial connection memory, the parallel connection memory, the serial and parallel multiplexers and the multi-function bus interface.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several Figures of which like reference numerals identify like elements, and in which:

FIG. 10 is a table illustrating messages from user interfaces;

DESCRIPTION OF THE PREFERRED EMBODIMENT

Figure 1A:
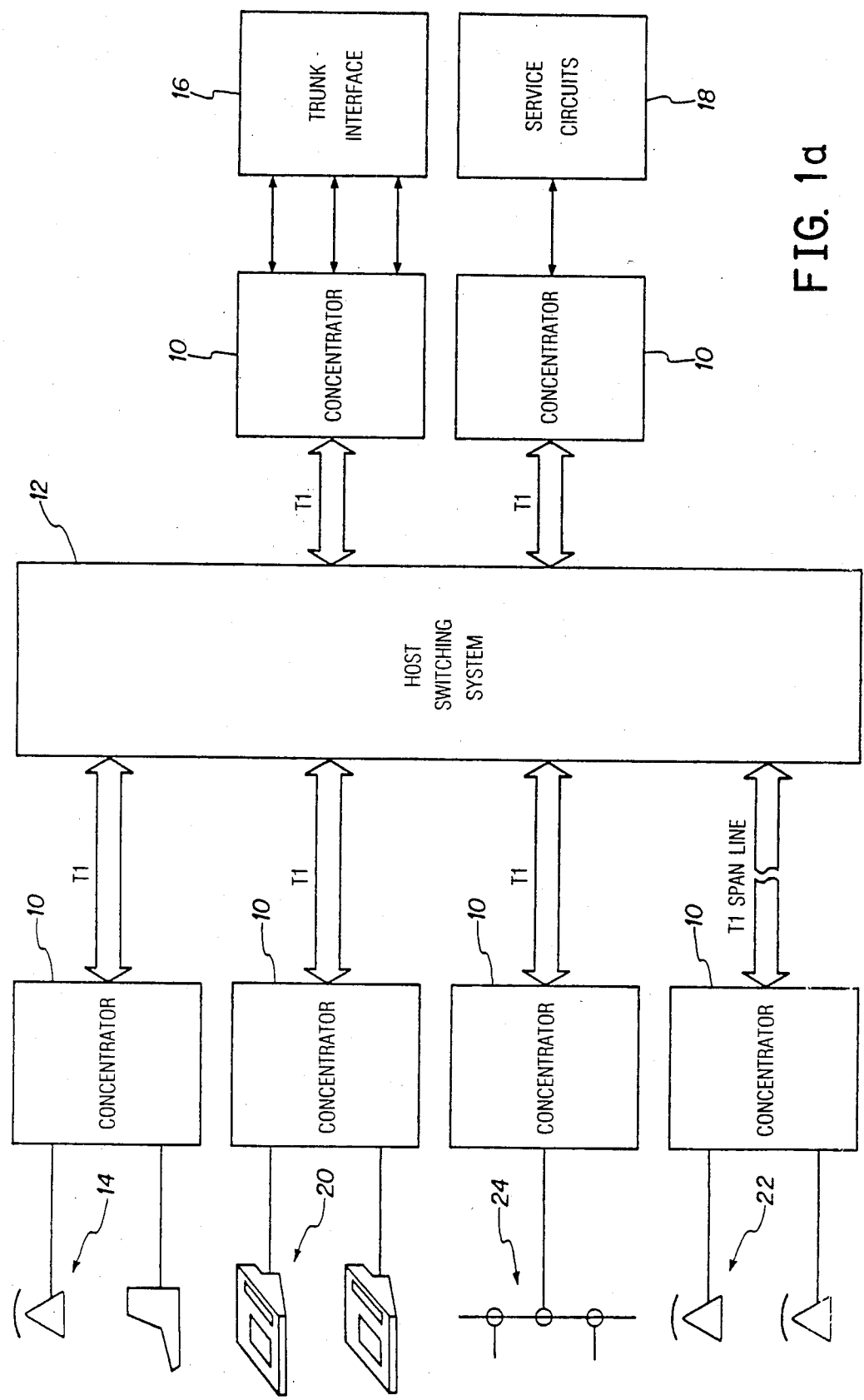
FIG. 1a is a general block diagram illustrating the connection of the novel invention with a host switching system and user devices.
Figure 1B:
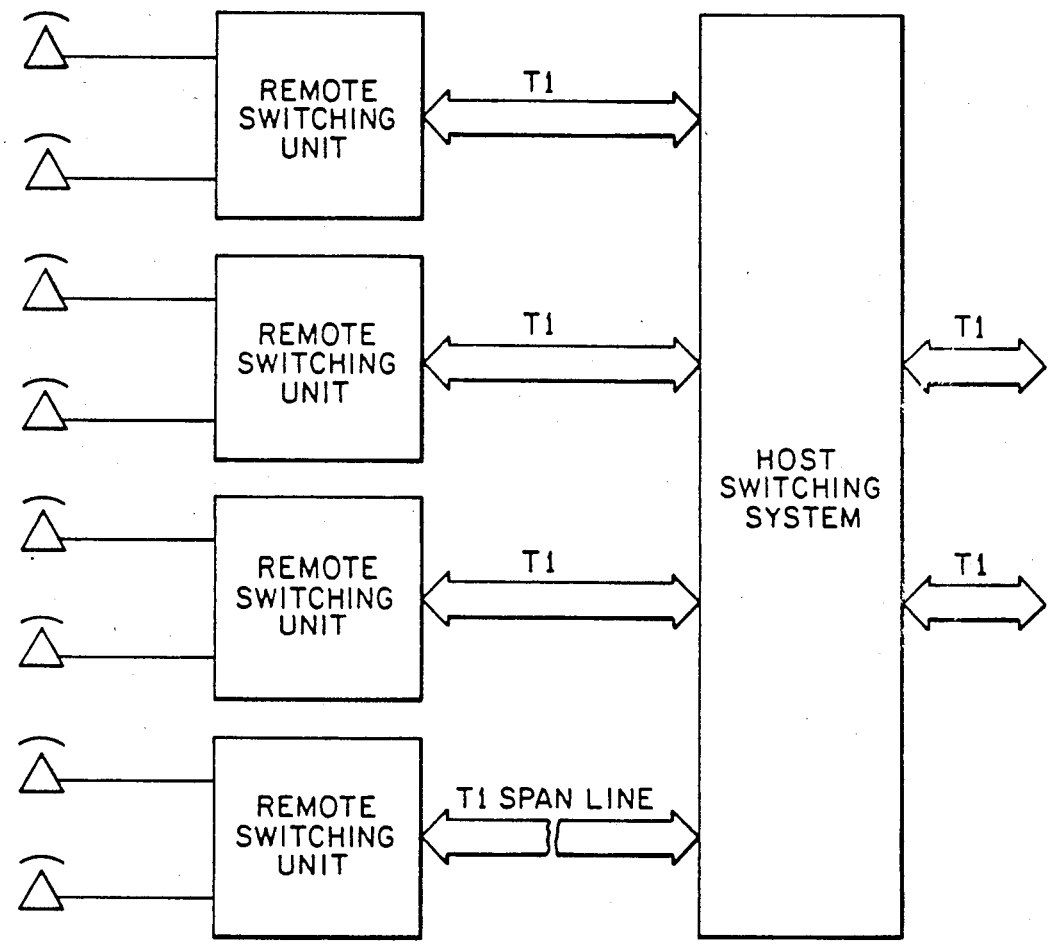
FIG. 1b is a general block diagram of the novel invention assuming the personality of a stand-alone switch.
Figure 1C:
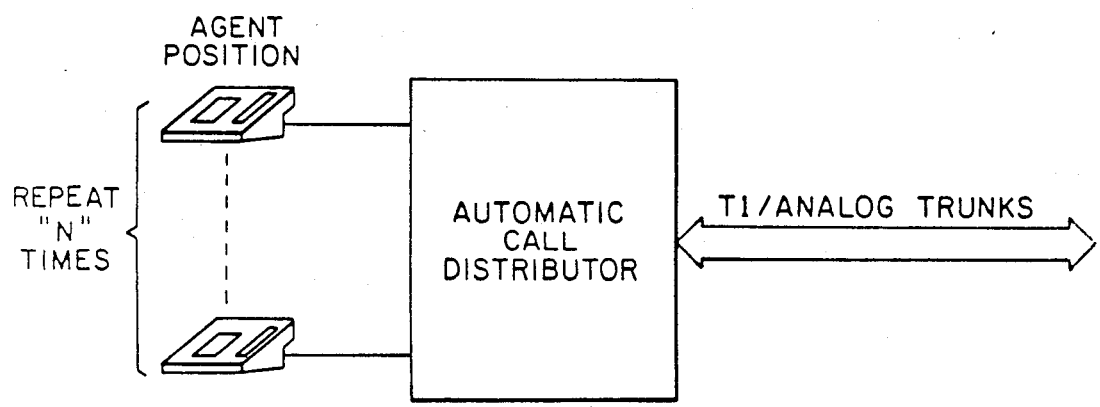
FIG. 1c is a general block diagram of the novel invention assuming the personality of an automatic call distributor.
Figure 1D:
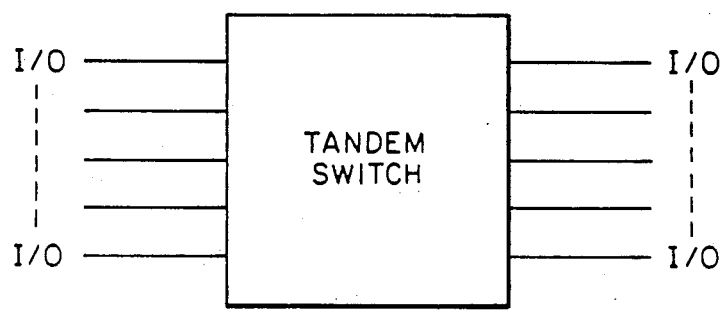
FIG. 1d is a general block diagram of the novel invention assuming the personality of a tandem switch.
Figure 1E:
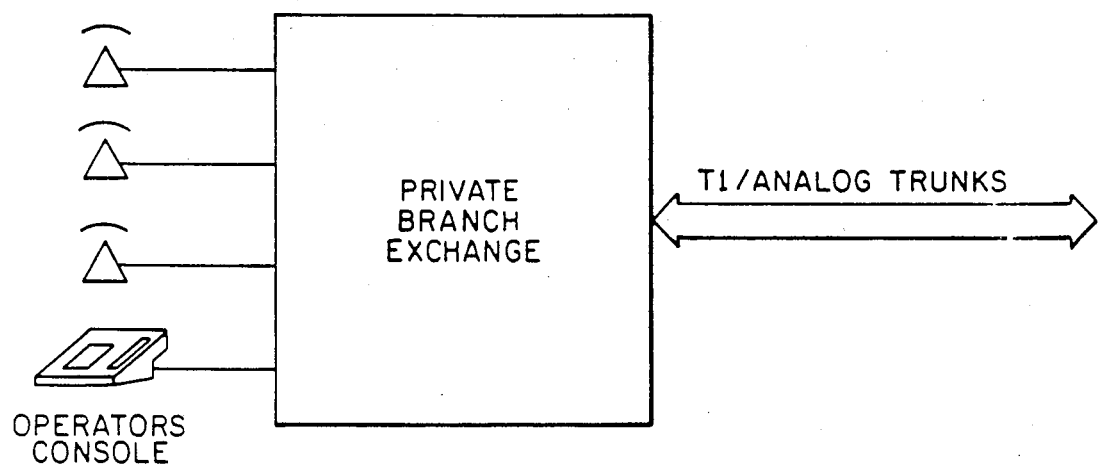
FIG. 1e is a general block diagram of the novel invention assuming the personality of a PBX.

FIG. 1a shows the switching system assuming the personality of a concentrator. While this specification explains in detail the concentrator personality, it should be understood that the switching system of this invention may assume any one of a number of personalities, and examples are shown in FIGS. 1b through 1e.

The structure of the concentrator 10 lends itself to a variety of application configurations as shown in FIG. 1. When hosted by either a Galaxy or SCX switching system 12, the switching system 10 can assume multiple personalities. Typically, the switching system 10 can be used to provide local area distribution for both analog and digital subscriber terminal equipment 14. In addition, the switching system 10 can terminate trunk interfaces 16 from both public and private networks. In a special application, the switching system 10 can be used to provide termination for system Service Circuits 18 such as Registers and Tone Sources. As shown in FIG. 1, all of these applications use T1 transmission facilities for inter-machine transport.

The inherent switching capabilities and the flexible control subsystem of the switching system make it suitable for stand-alone applications. There, applications may include small tandem switches and key systems. The systems personality is determined by the circuit and the application software provided.

For applications which use an automatic call distributor or tandem switching system as a host in providing local distribution to subscriber terminals, the control functions of the switching system are minimal. Typical of the control functions of the switching system are as follows:

1. Recognition of requests for service from the interface units.
2. Assignment of T1 channels to connections.
3. Forwarding control messages to the host switch relating the originator's identification and the assigned T1 channel.
4. Continuous updating of the host switch control system with interface circuit state changes. (Telephony signaling events).
5. Translation of control messages from the host switch control system and invoking the proper command to the interface circuit such as:
   (a) Ring
   (b) Seize
   (c) Release
6. Exchange of maintenance and status information with the host switch control system.

In general, the concentrator control subsystem is a slave pre-processor of telephony signaling events for the host switch control system. The host switch control system is responsible for performing all of the call processing and administrative functions.

In applications where the concentrator is hosted by a larger switching system, local (intra-concentrator) switching is not required. All connections intra- and inter-concentrator utilize the T1 channels through the host switching network. This reduces the software overhead in both control systems by eliminating redundant connection mapping and time slot contention arbitration.

When used for terminating Key Telephone Subscribers 20, the concentrator control system is equipped with a higher level of intelligence. The concentrator control subsystem is provided with a data base which contains the information unique to the Key System Subscribers being served by the concentrator control subsystem. For this application the elements of the data base are as follows:

1. Key group assignments.
2. Key function assignment per station and key.
3. Lamp, display, and ringing control.
4. Call origination and supervision processing.
5. Call processing for local intercom calls.
6. Recent changes, administration, and maintenance.

The switching functions of the concentrator configured as a Key System requires local connections for both intra-concentrator intercom and bridged (non-privacy) calls. Switched access to the T1 channels provides trunk and inter-concentrator intercom call capability via the host system switching network.

In a large system, distributing the Key System control function to each concentrator limits the size of any one key group to 192 subscribers. This is not considered detrimental in view of the potential for stand-along operation.

The concentrator configured for Key System Operation is essentially a stand-alone subsystem. Its interface to the host switch provides access to trunk groups and inter-concentrator intercom calls. Equipping the concentrator with access trunks would allow the unit to function as a stand-alone Key System.

The concentrator may be used to provide service circuit 18 termination for the Galaxy switching system. Digital tone sources, registers, and register senders can be installed in the concentrator and linked to the switching and control subsystems of the Galaxy via the T1 channels. In this application, the concentrator control subsystem assumes a relatively passive role. The concentrator control is slaved to the host switch for sending and receiving DTMF and MF dialing and applying the appropriate call progress signals to connections. The switching functions of the concentrator in this application are limited to T1 channel access under the control of the host switch control system.

For remote subscribers 22 and as a remote switching unit, the concentrator control sybsystem is provided with a substantial amount of call processing intelligence. In addition, software is provided for administration and extended maintenance capabilities. The functions not performed by the concentrator are deferred to the host switching system. Typical deferred functions are:

1. Packet Routing
2. Call Management
3. CDR Data Collection and Reporting

4. Attendant Functions
5. Traffic Statistics
6. Administration

The switching requirements for the remote switching unit include local connections and access to the host switch via the T1 facilities. The T1 facilities serve as transport for all communications between the remote switching unit and the host switching system. Several T1 channels are reserved for processor inter-communication and for user voice and high speed data transport.

When T1 facilities are not available, linkage to the host switching system is provided by analog trunks. The control and packet data are extended to the host via high speed (9.6 kb) modems.

The ability to provide direct switched interface to Local Area Networks (LAN) 24 such as Ethernet is inherent in the concentrator design. An interface module equipped with an IEEE 802 compatible interface provides both packet and circuit switched access to the LAN. The ability to assign variable bandwidths to the interface will allow both high speed and low speed access to the LAN peripherals. The LAN interface may be associated with any of the concentrator configurations. The concentrator control needs only to establish a circuit switched or a virtual packet switched connection from either a local or remote subscriber over the T1 or local switching network to the LAN interface port. The LAN interface module is self sufficient with an on-board processor whose capability includes protocol conversion. This ability relieves the common control subsystem from this responsibility and associated overhead.

Figure 2:
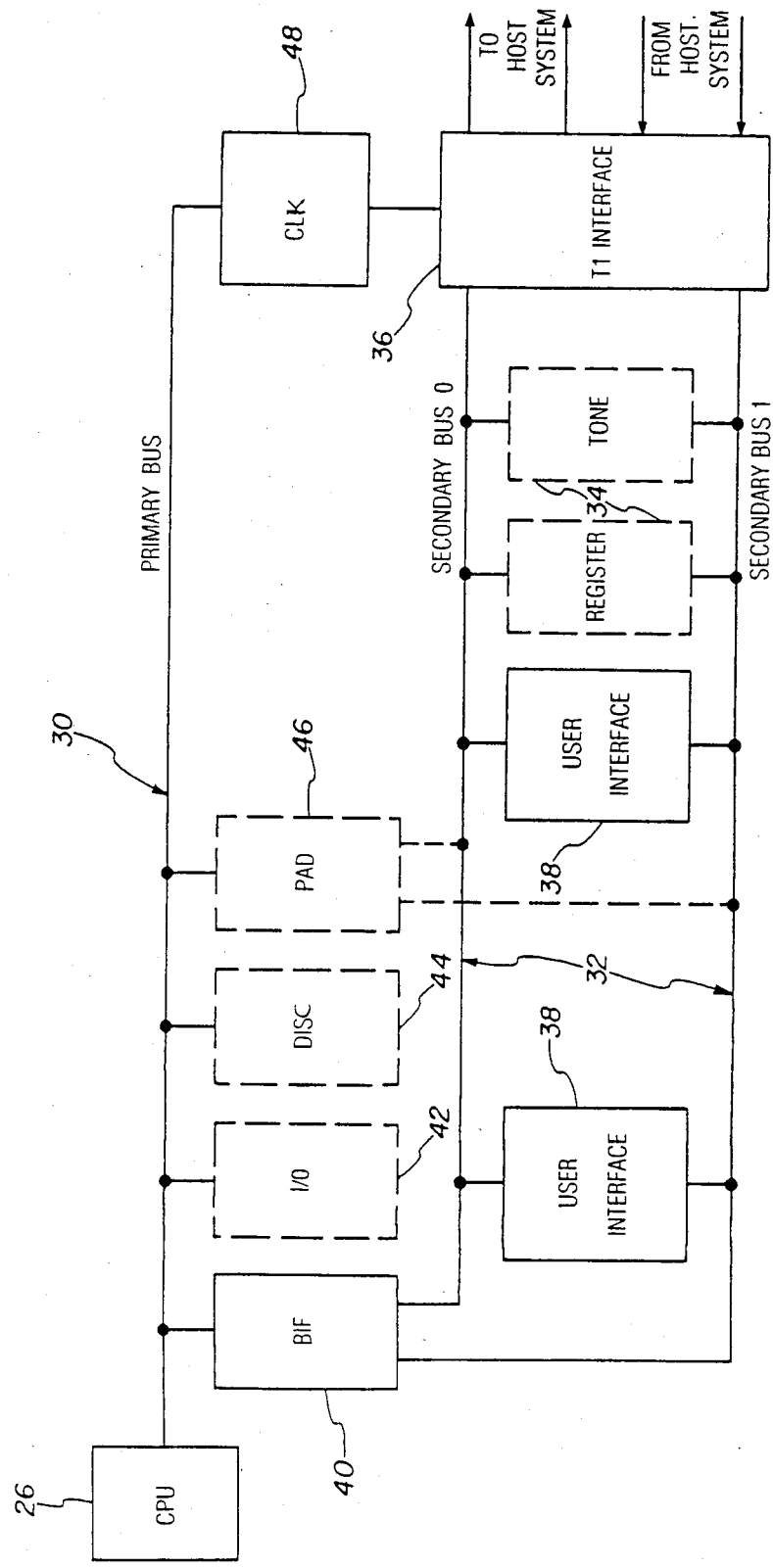
FIG. 2 is a general block diagram of the primary modules in the concentrator.
Figure 3:
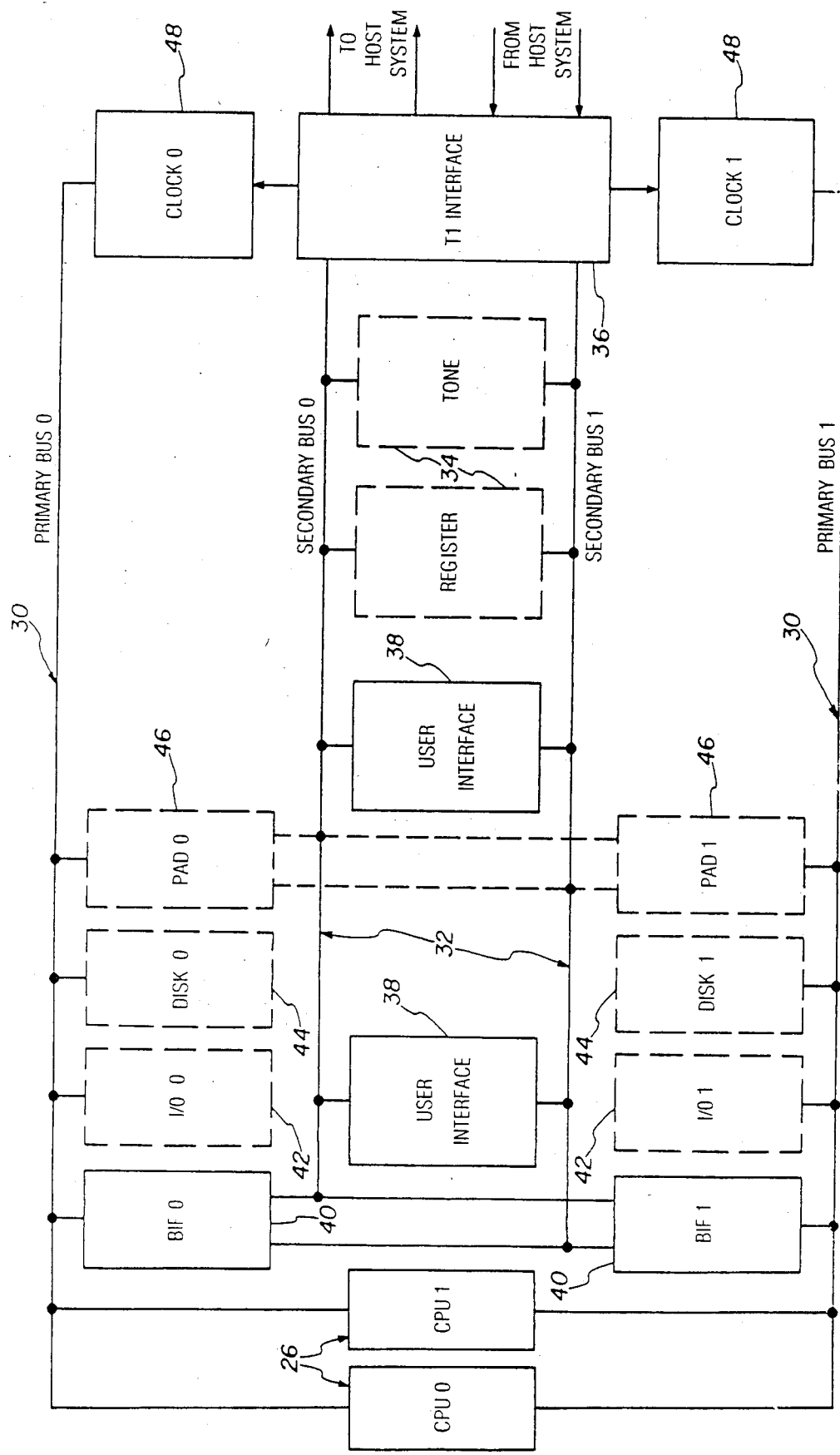
FIG. 3 is a general block diagram of the major elements of the concentrator in a duplex configuration.

FIG. 2 depicts the structure of the concentrator. The concentrator module consists of control subsystem, consisting of a central processing unit 26 and a primary bus 30, a multi-function bus 32, T1 interface 36, and subscriber interface units 38. This module provides service for 192 user ports concentrated to 48 T1 channels which link the concentrator to the host switching system. This module is simplex and can be used in an associated or stand-alone configuration. Duplex capability is provided by adding a second module as shown in FIG. 3. The duplex configuration provides 384 user ports concentrated to 96 T1 channels. The duplex configuration provides redundancy of common control equipment to enhance system availability.

As shown in FIG. 2, the concentrator is based on a two bus structure. The primary bus 30 is a high-speed duplex serial HDLC link between the Central Processing unit (CPU) 26 and its appended support modules. The support modules consist of the Bus Interface (BIF) 40, Input/Output (I/O) 42, Disc Interface (DISC) 44, Packet Assembler/Disassembler (PAD) 46, and the Clock Generator (CLK) 48.

The BIF 40 is an intelligent module that performs transition processing between the multi-function bus 32 supporting the user interfaces 38 and the CPU 26. When equipped, the I/O module 42 provides interface between external peripheral devices, such as CRT's, printers, modems, and tape units, and the CPU 26. The Disc 44 provides for system IPL and backup in stand-alone concentrator applications. The PAD 46, when required, deals with the packet switching and transmission capabilities of the concentrator. The CLK 48 receives input from the T1 interfaces 36 and generates all of the internal clock, reset, and strobe signals used by the concentrator.

The multi-function bus 32 is a parallel bus structure which performs multiple functions. shown in FIG. 2, the multi-function bus 32 links the user interfaces 38 to the T1 interfaces 36, and the BIF 40. The multi-function bus 32 provides the switching function for both local (intra-concentrator) and remote (via T1) voice and data connections. Control access from BIF 40 to the user interfaces 38 is also supported by the multi-function bus 32. The multi-function bus 32 is duplicated for reliability and is switched under the control of the BIF module 32.

FIG. 3 shows the duplex configuration of the concentrator. As is shown, the CPU and its support modules are duplicted on separate primary busses. Depending on the application, the redundant set of circuit cards may be installed; however, the full set of user interfaces can be used without including the full redundancy.

Figure 4:
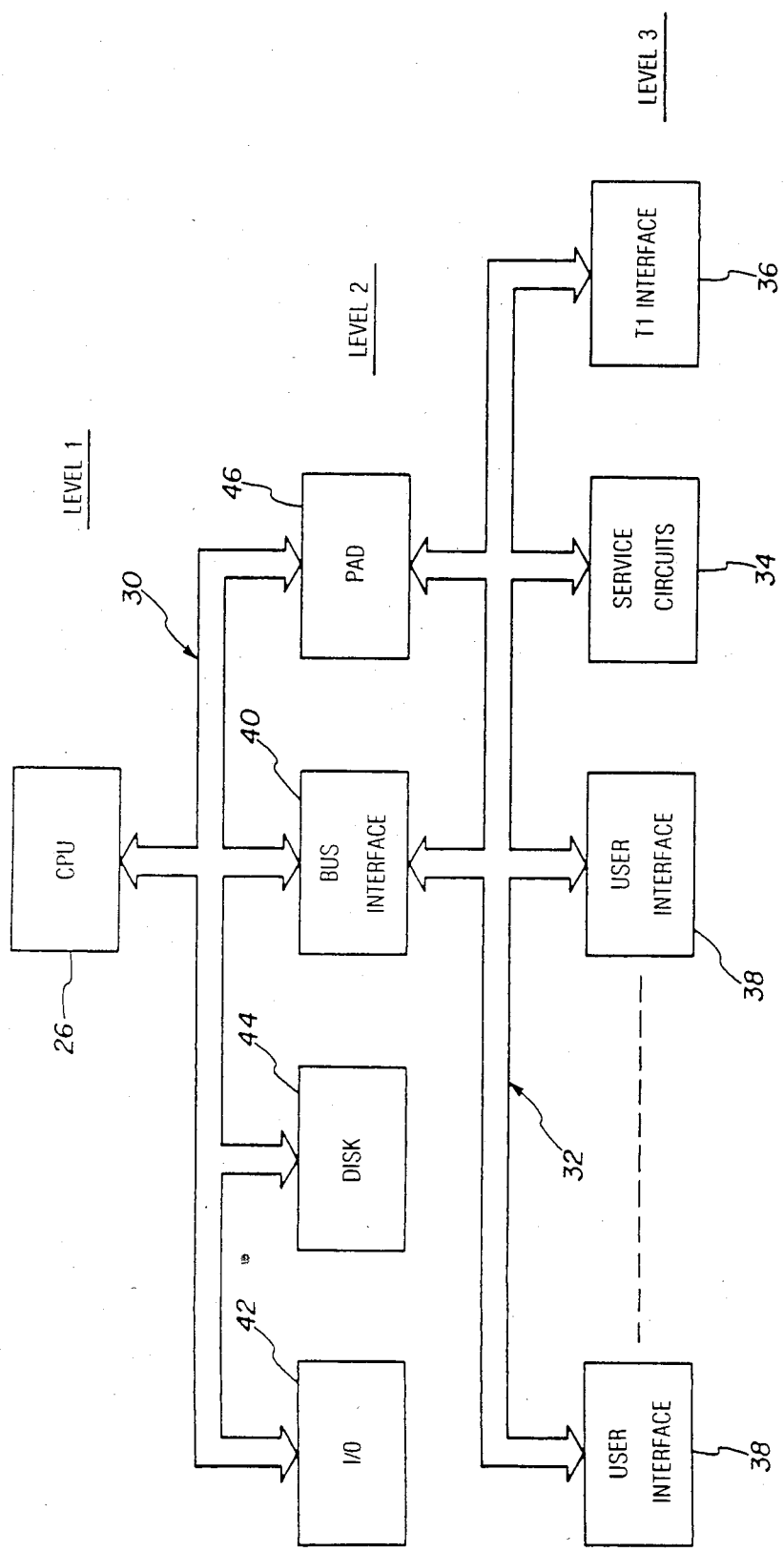
FIG. 4 is a block diagram illustrating the levels of operation in the concentrator.
Figure 5:
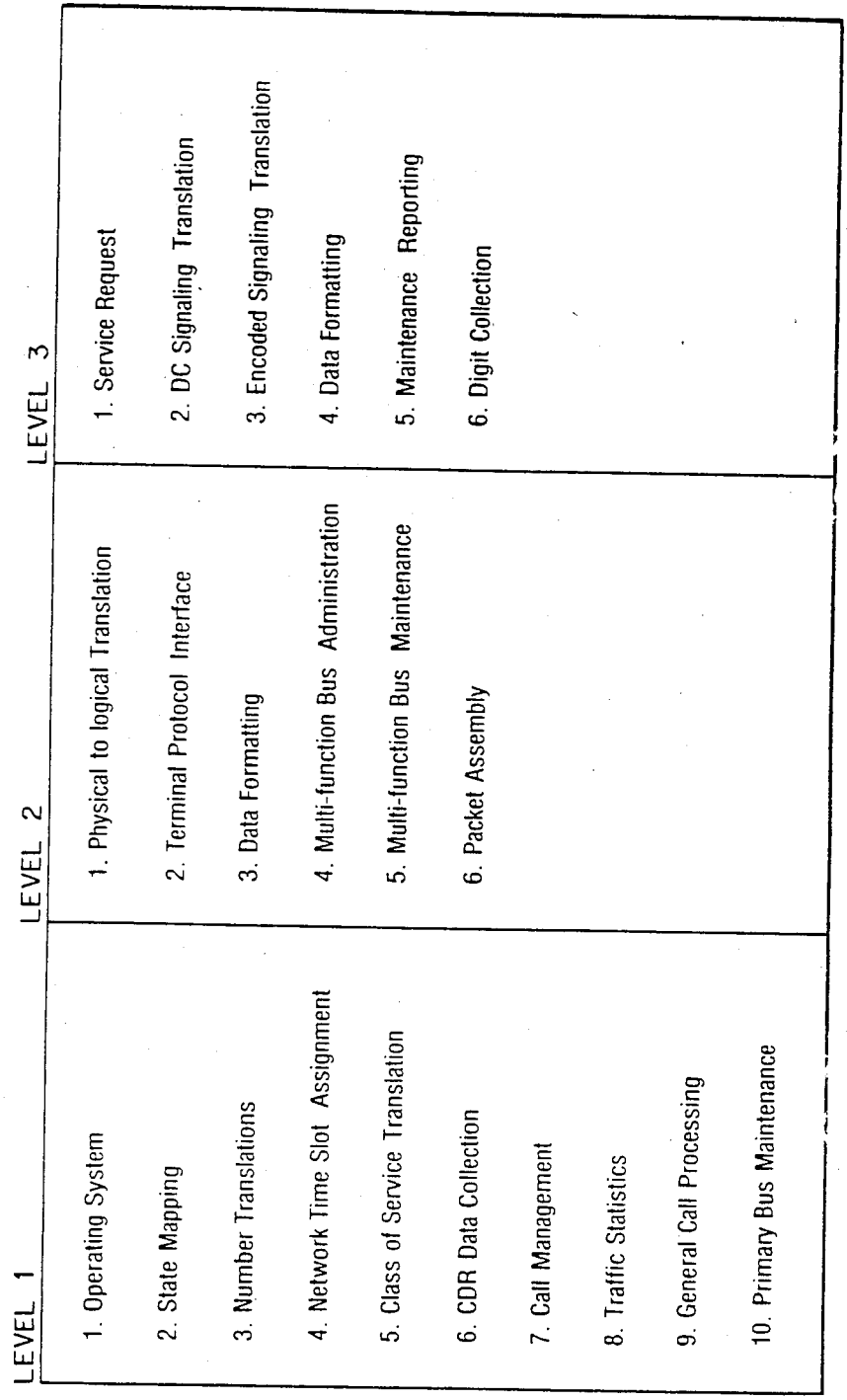
FIG. 5 is a table illustrating the functional operations of the different levels of the FIG. 4 diagram.

The generic structure of the concentrator control system employs a centralized processor with distributed functional pre-processors. Each of the circuit modules have on-board intelligence. FIG. 4 shows the distribution of processing capability and FIG. 5 identifies the major functions performed by the various processing elements.

The lowest level (level 3) of processing appears in the user interfaces 38. This processor performs the translation from DC or encoded signaling information to a high level command format which is universal to all interfaces. The high level commands are then forwarded to the concentrator control subsystem via the bus interface 40. The second level of processing (level 2) appears on the Bus interface Module 40. This interface 40 provides the linkage from the control subsystem (primary bus 30) to the switching network control (multi-function bus 32) serving the user interfaces 38. Physical to logical translation, interface scanning, error detection, and the time synchronization are the typical functions provided at this level. The highest level of processing (level 1) in the concentrator is the control subsystem processor 26. Depending on the application of the concentrator, the amount of processing required at this level will vary. This processor is linked via T1 channel to the host switch processor in all cases except stand-alone 36.

Figure 6:
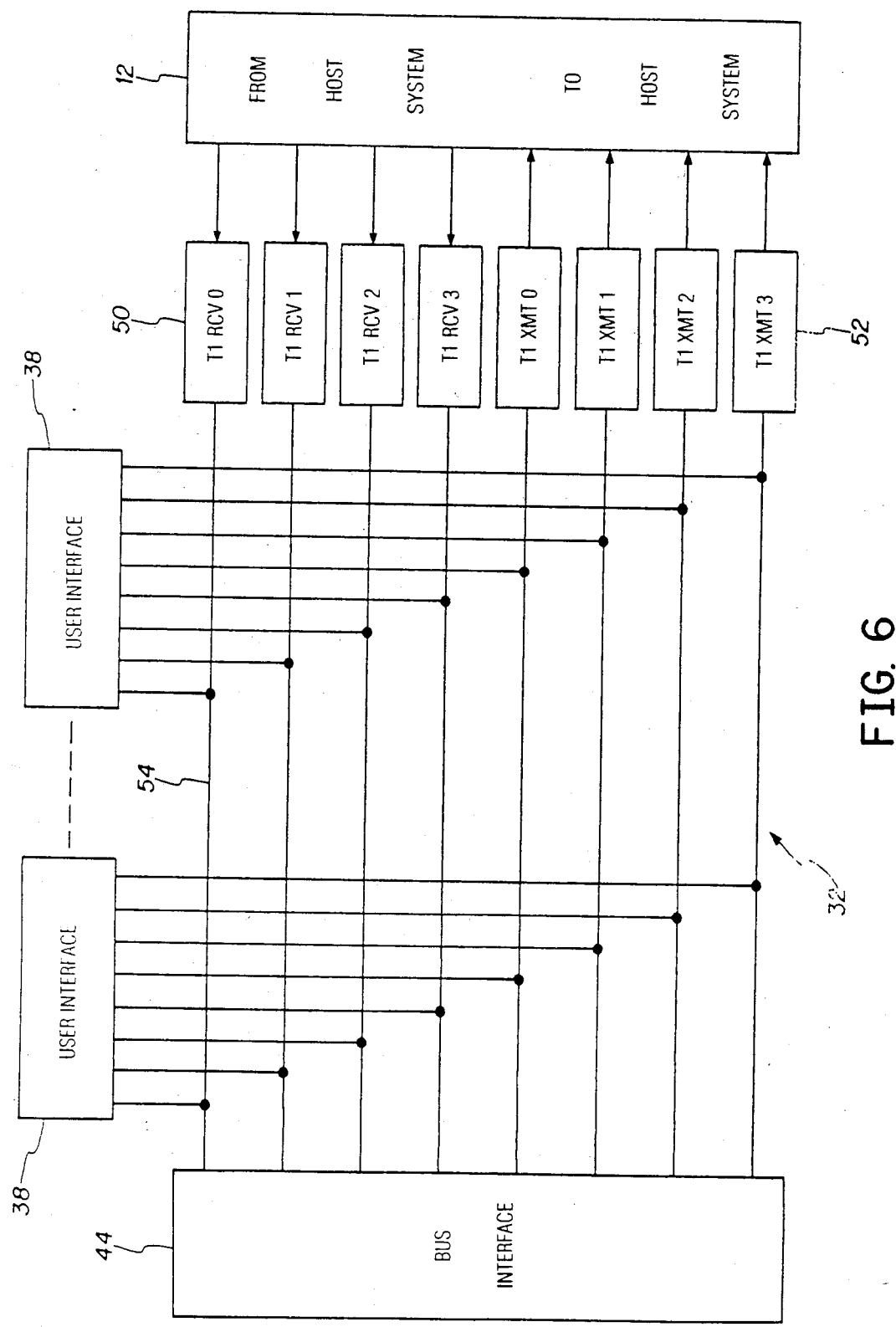
FIG. 6 is a block diagram illustrating the multi-function bus connection used in the concentrator.

In the preferred embodiment, the multi-function bus 32 is used in both a serial and parallel format. Intra-concentrator (local) connection uses the multi-function bus as a parallel structure. Connections via the T1 channels are transported on the multi-function bus 32 in a serial format. As shown in FIG. 6, the multi-function bus 32 is configured from the terminations of up to four T1 circuits 50 for receiving and four T1 circuits 52 for transmitting and linking the concentrator to the host switching system. The four T1 circuits provide 96 duplex 64 kb channels. These 96 channels appear serially on the eight busses 54 comprising the multi-function bus 32. The 96 duplex channels are split into four transmit lines and four receive lines. Each of the eight lines 54 carries 24 64 kb channels. Each frame consists of eight bits or 192 bits total for 24 channels to which one bit is appended for framing.

In the preferred embodiment, a frequency multiplier on the clock module 48 generates 6.176 mb, 3.088 mb, and 1.544 mb signals from the incoming 1.544 mb T1 bitstream. These clocks are distributed as required to the user interfaces 38 and the various control circuits which connect to the multi-function bus 32.

Figure 7:
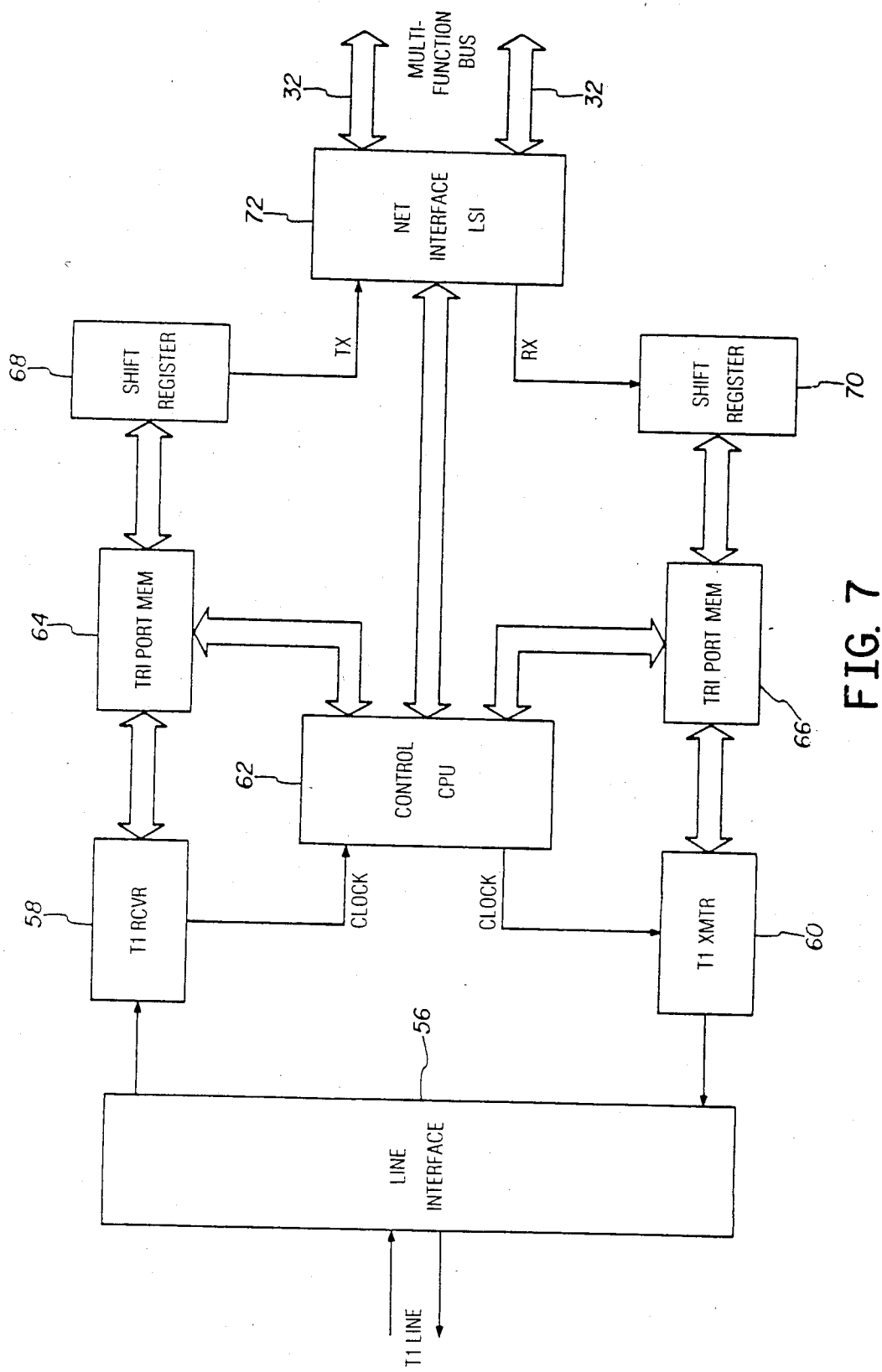
FIG. 7 is a block diagram of the interface circuitry used to interface with the host switching system.

FIG. 7 shows the major elements of the T1 interface 36. This interface 36 terminates one T1 line used to interconnect the concentrator 10 to the host system 12. The interface 36 has a means 56 for converting information signals on the T1 line from bi-polar to uni-polar, and provides line equalization. The receiving means 58 recovers clock, framing, and alarm signals from the information signal and is operatively connected to the means 56. The means for transmitting 60 transmits the information and receives parallel input and generates serial output and is operatively connected to the means 56. Signalling, alarms, and zero code suppression are its attributes. A processor means 62 is provided for controlling the information signal and receiving a clock signal from the receiving means 58, and transmitting a clock signal to the transmitting means 60. First and second triport memory means 64 and 66 are used for buffering and are operatively connected respectively to the receiving means 58, and to the transmitting means 60. Both triport memory means 64 and 66 are operatively connected to the processor means 62. A first shift register 68 provides a transmit signal and is operatively connected to the first triport memory means 64. Similarly, a second shift register 70 is used for accepting a receive signal and is operatively connected to the second triport memory means 66. Finally, a network interface means 72 is used for interfacing the transmit and receive signal with the multi-function bus 32, and is operatively connected to the processor means 62.

Figure 8:
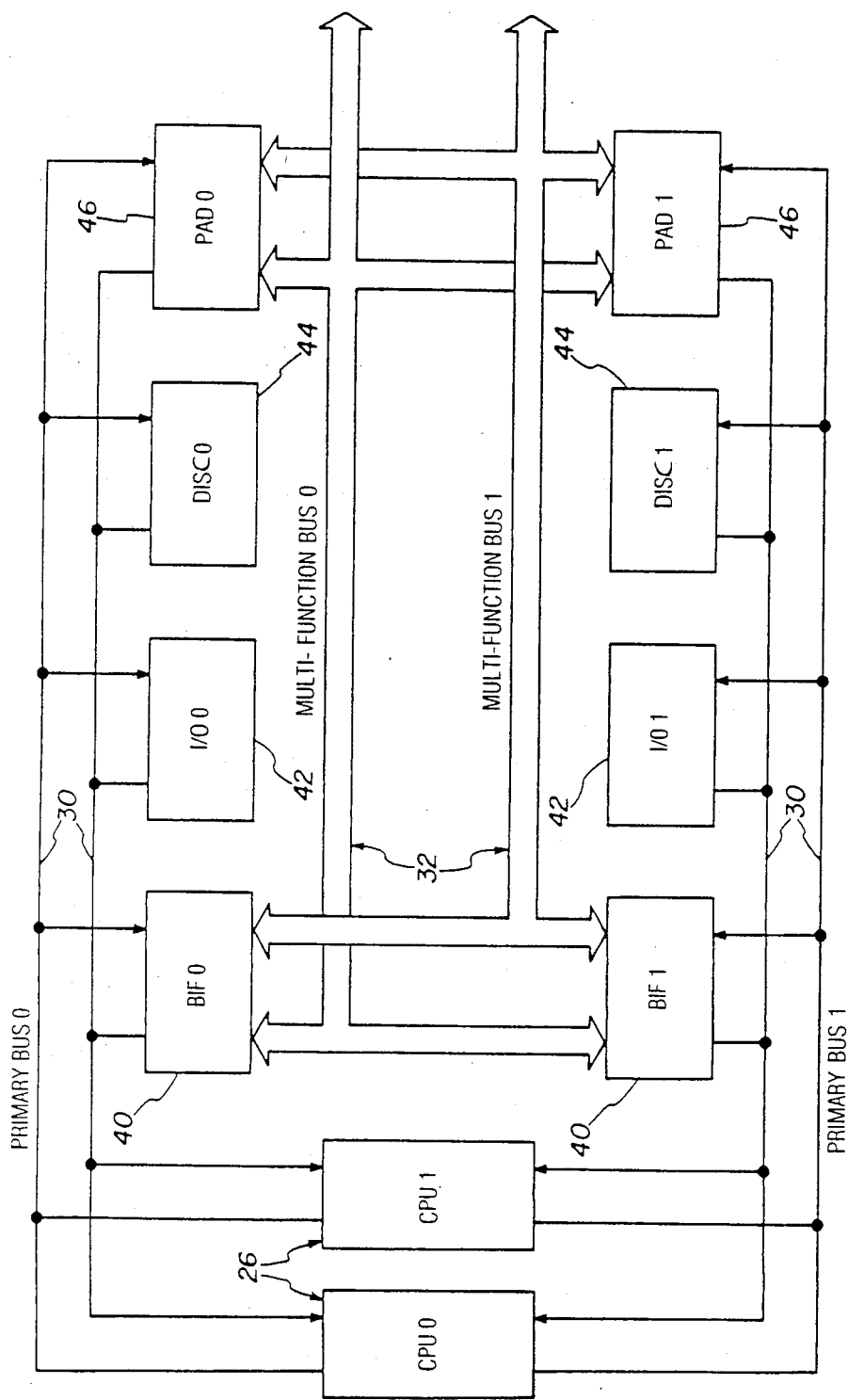
FIG. 8 is a general block diagram of the operating portion of the concentrator.

FIG. 8 shows the configuration of the concentrator control subsystem. Though shown in a redundant structure, the control may be operated simply by removing the supplicated modules. The linkage between the Central Procesing Unit (CPU) 26 and the support modules is a full duplex serial transmission facility using HDLC. The serial link is clocked at 3.088 mb, which is derived from the received T1 clock. The serial primary bus 30 is used in a "poll-response" mode with the CPU 26 being the master. All information exchanged between the CPU 26 and its support modules is transported on the serial primary bus 30.

In its simplest form, the concentrator control subsystem consists of the CPU 26 and a Bus Interface (BIF) module 40. The BIF 40 provides the link between the serial bus (primary bus) 30 and the previously described multi-function bus 32.

The Disc Interface (DISC) 44 Input/Output (I/O) 42, and the Packet Assembler Disassembler (PAD) 46 modules are appended to the control system as the application requires.

Two T1 channels are assigned to provide data transport between the concentrator and the host system. The concentrator CPU 26 has access to the T1 channels transmit and receive via the BIF module 40 which terminates on the multi-function bus 32. The data format on the 64 kb channels is HDLC.

Figure 9:
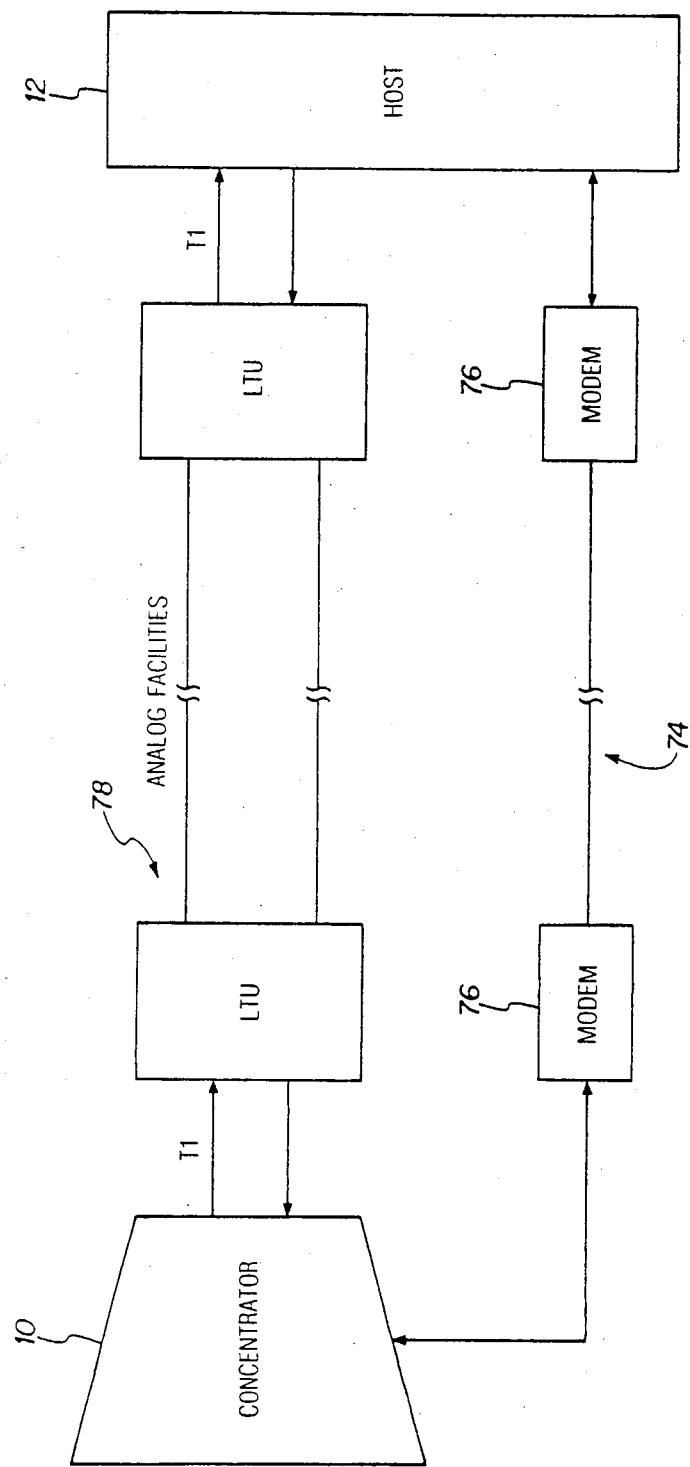
FIG. 9 is a geneal block diagram illustrating an alternative connection for the concentrator with the host switching system.
Figure 11A:
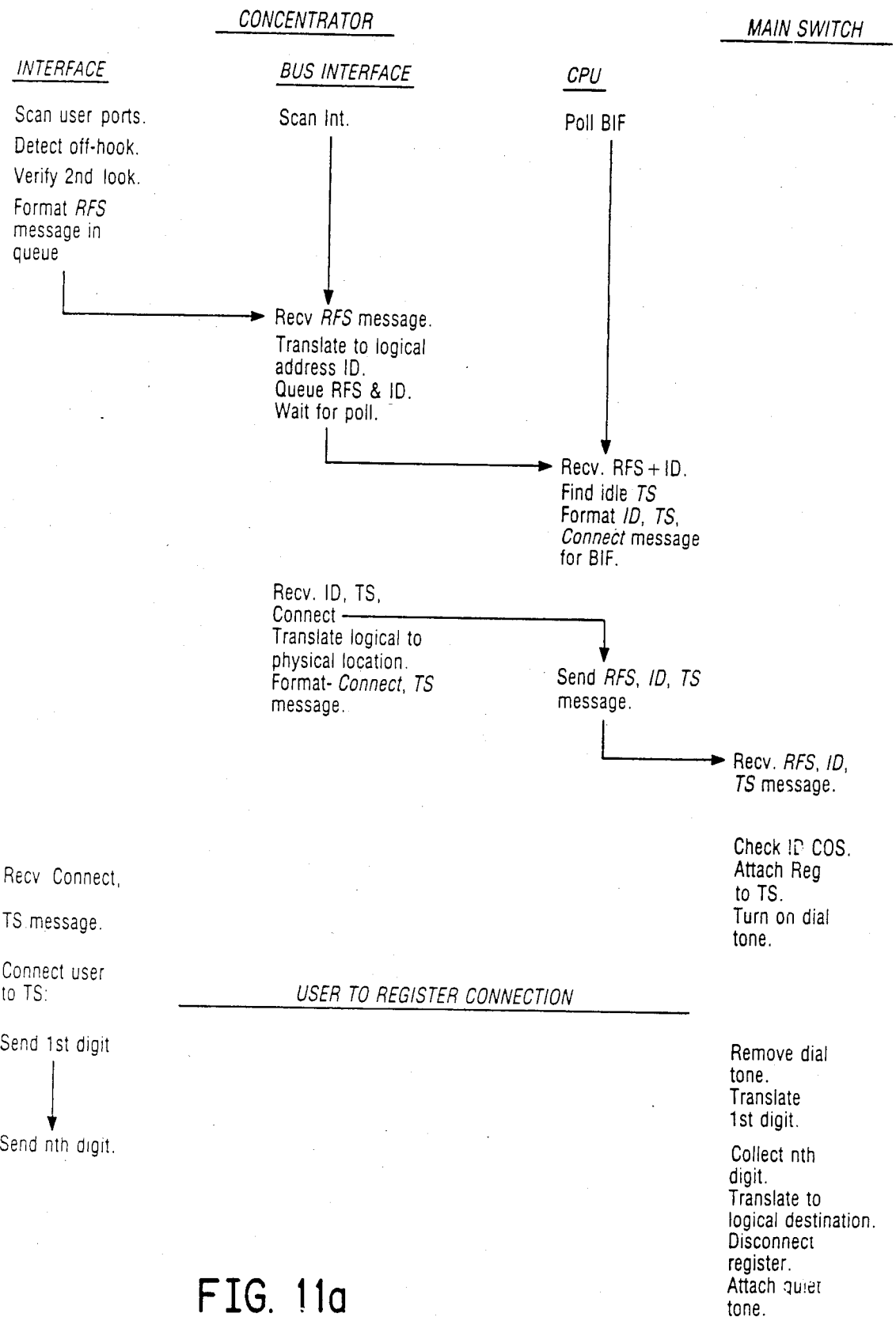
FIGS. 11(a)-11(b) and 12(a)-12(d) are flow charts depicting message flow to and from the user interfaces.
Figure 11B:
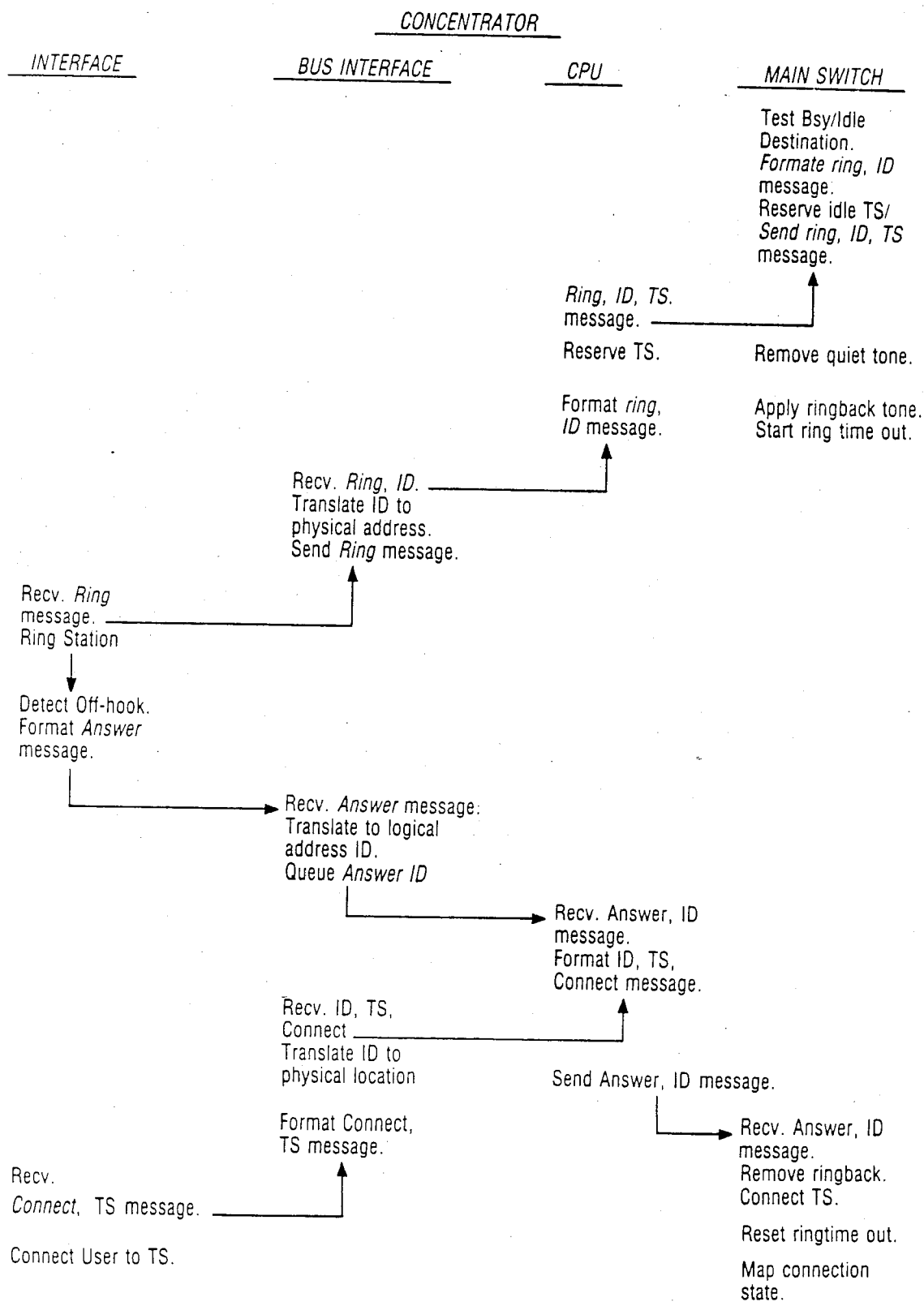
Figure 12A:
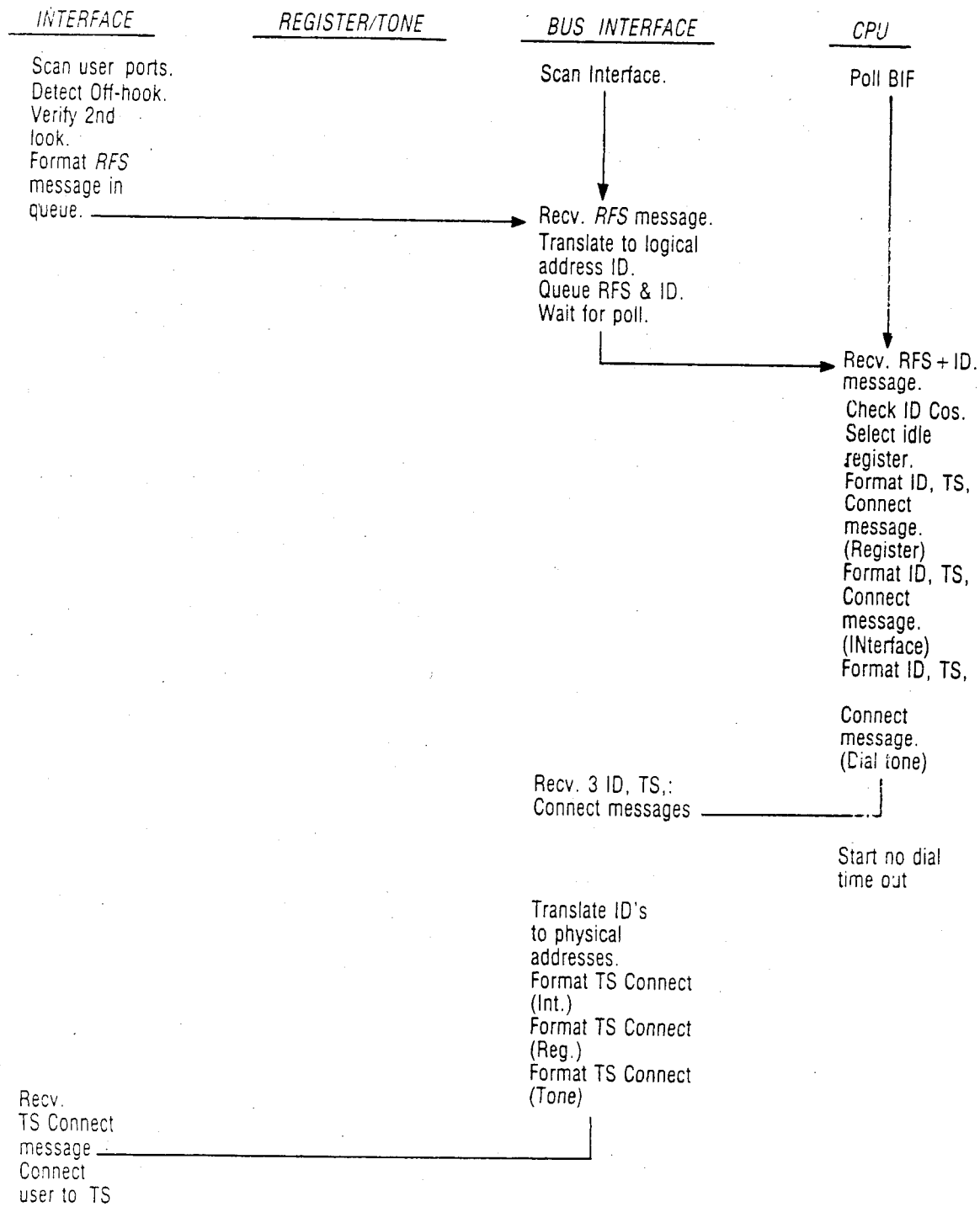
Figure 12B:
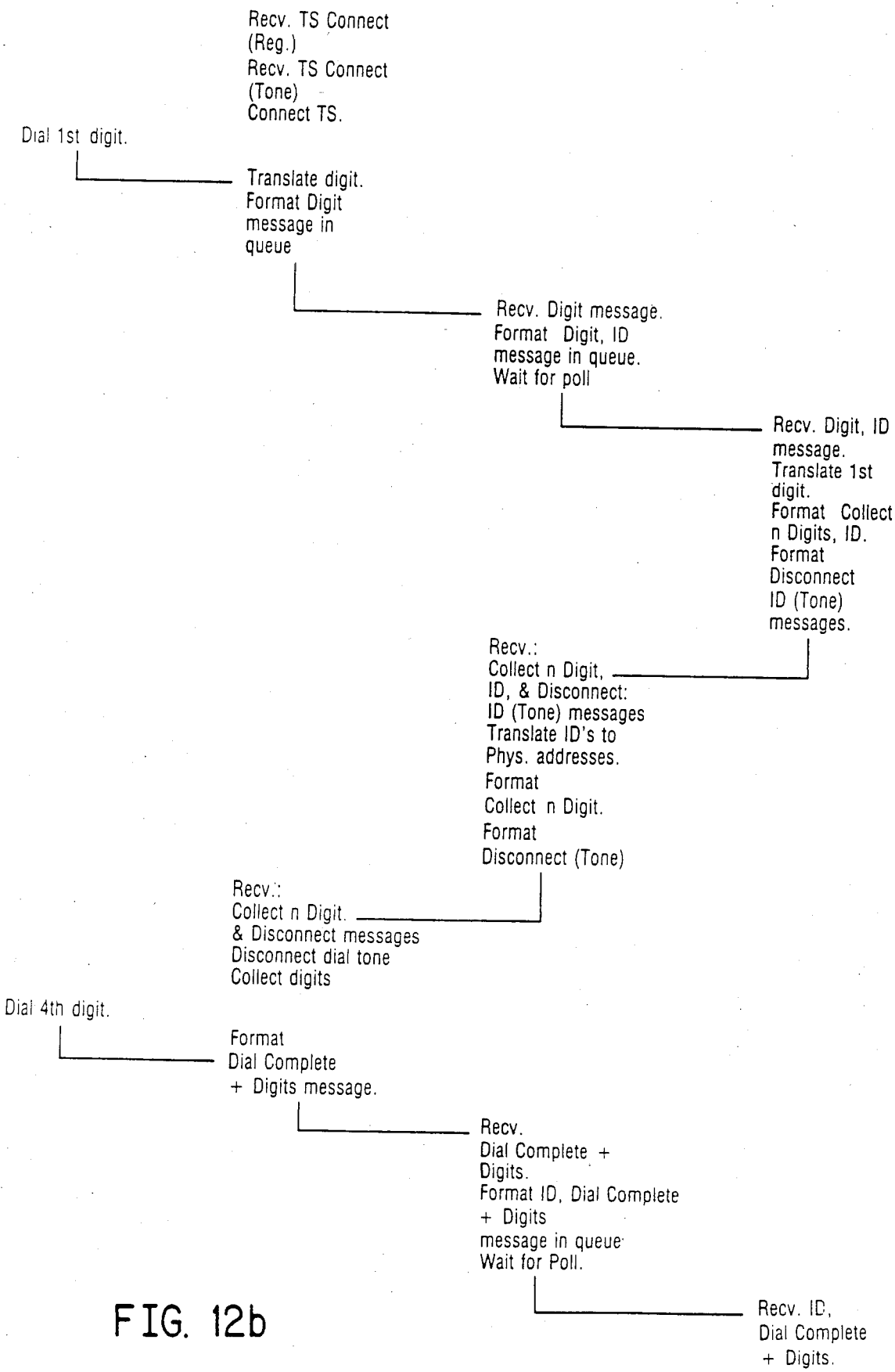
Figure 12C:
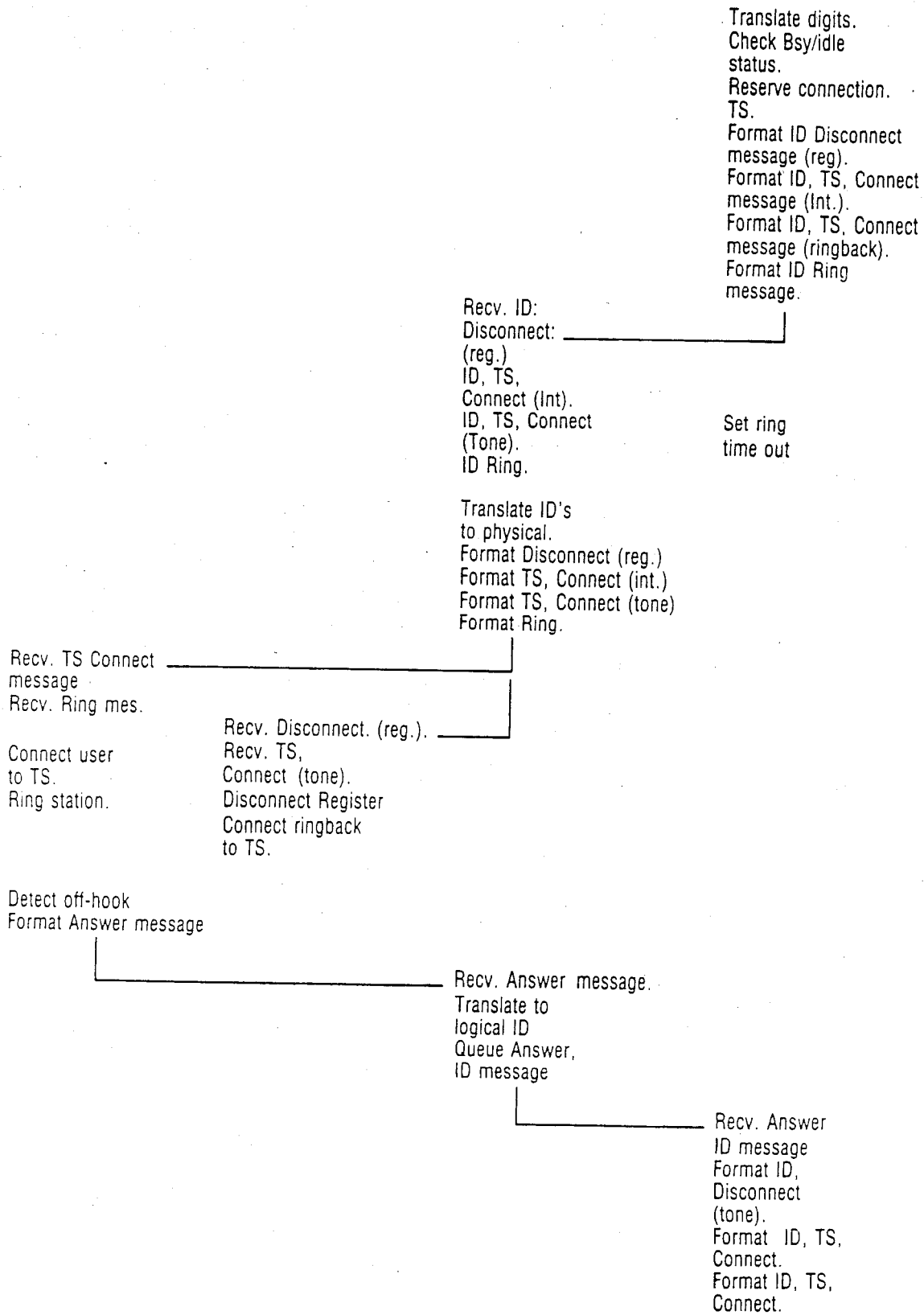
Figure 12D:
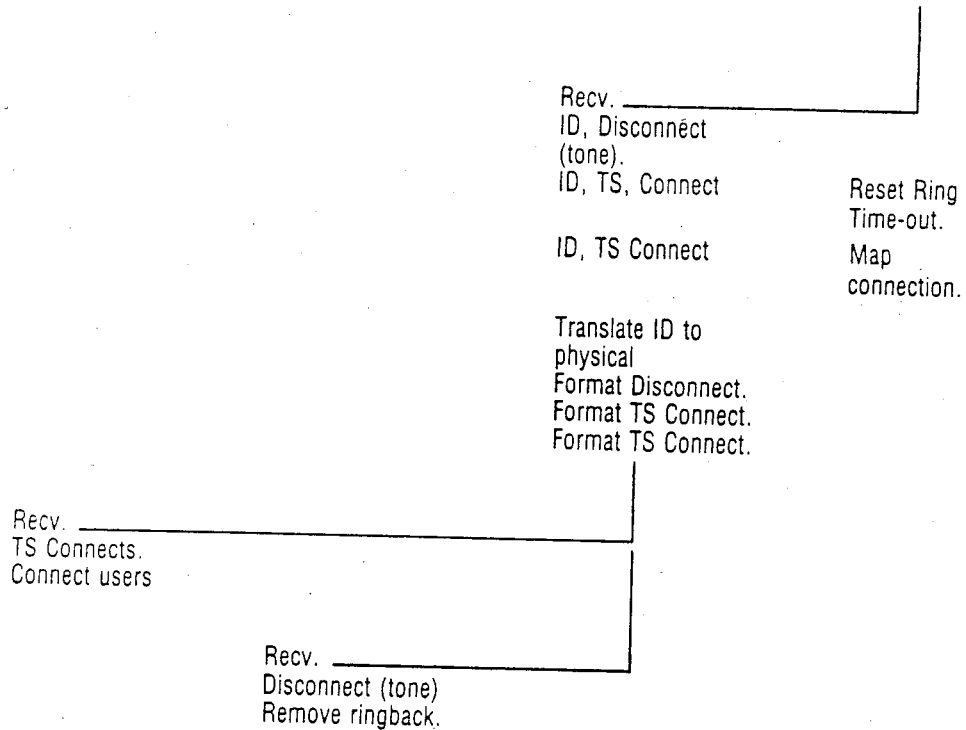

Although the concentrator is optimized around the use of T1 facilities for linkage to the host system, analog facilities may be used. FIG. 9 shows the analog facilities required to provide the voice and data channels when T1 facilities are not available. The data channel 74 is equipped with high-speed (9.6 kb) modems 76, while the remaining channels 78 utilize conventional 2-wire or 4-wire analog transmission circuits. The signaling for the analog transmission circuits is carried over a data channel.

The operation of the concentrator control system is based on a multi-level processing format. Each module of the concentrator has on-board intelligence which varies with the interface functions it performs. At the lowest level, the user interfaces 38 are conditioned to process telephony signaling events.

The processing of the telephony signaling at the interface level, relieves the CPU 26 of dealing with real-time events. Another attribute of processing at the user interface 38 level is the resultant control message format which provides uniformity to the higher processing levels. FIG. 10 provides a list of control messages which are set and received at the user interface 38. Each user interface 38 will use a subset of the control messages depending on the specific type of user service being provided.

The second level of processing occurs in the BIF module 40. The BIF 40 is chartered with scanning the user interfaces 38, reformatting the control messages, appending information to the control message and forwarding the composed message to the concentrator CPU 26. Messages received from the CPU 26 are interpreted by the BIF 40, reformatted, and sent to the particular interface circuit 38. These actions performed by the BIF 40 further isolate the CPU 26 from the user interfaces 38, and off-load the interface scanning maintenance and administration functions from the CPU 26.

The highest level of processing in the concentrator is retained by the CPU 26. At the CPU level, data base management, network mapping, state mapping and host system interface are the major tasks to be performed.

Overall, the concentrator control system is structured to serve a variety of applications with minimum impact on the interfaces 38 The partitioned levels of procesing distribute the total processing in a functional basis with minimal interaction due to the high level of control message format.

FIGS. 11a, 11b, and 12a, 12b, 12c, 12d are call flow charts which depict the control message flow to and from the user interfaces 38. The orderly flow of information up and down the control structure hierarchy can be seen from these charts.

The CPU 26 communicates to the primary bus 30 using a 3.088 MB serial HDLC link. Each primary bus module is strapped with its address and is conditioned to respond to the poll. Using HDLC as the data link protocol, short messages (less than six bytes) become very inefficient due to the protocol overhead. Providing each primary bus with a 128 byte buffer will allow for more efficient use of the data link. The multi-function bus 32 can support up to 16K bytes per second of information from the user interface circuits 38. This control data, and up to 8K bytes of control data, arrive from the host system 12 on the T1 channel, and can be summed up to indicate the maximum data transfer at 26.4K bytes per second. Passing information at 128 bytes per roll, the BIF 40 must be polled 200 times per second or every five milliseconds.

The I/O module 42 serves 6 serial and 2 parallel ports, each with 9.6 kb. This provides approximately 8 kb per second of data to the CPU 26. Again, using 128 bytes per poll, the I/O module 42 must be polled every 15 milliseconds. The Packet Assembler/Disassembler (PAD) 46 generates routing information requests to the CPU 26 for each data call. Assuming 10 calls per second and 16 bytes of data per request, the PAD 46 generates only 160 bytes per second of data to the CPU 26. To provide fast response to data call request, the PAD 46 is polled every 10 milliseconds. The disc interface 44 is treated uniquely. Until command to IPL, the system polling of the disc 44 is for routine maintenance functions. Upon command from the CPU 26, the disc 44 is given full period access to the HDLC link. The data transfer is effected in 4K byte segments. Loading of the 512K bytes of CPU RAM will require 128 block transfers. Ignoring disc latency, loading the CPU RAM wil require 1.5 seconds.

The architecture of the concentrator is such that each of the various types of interfaces can be accommodated using the multi-function bus and the high level control command structure. The multi-function bus provides bandwidth flexibility for the switching function and the command format provides the control. Each of the various types of user interfaces has on-board intelligence. The level of intelligence varies with the type of service being provided. The on-board processor is responsible for dealing directly with the particular signaling required by the interface and by formatting the information into the high level control command structure.

Figure 13:
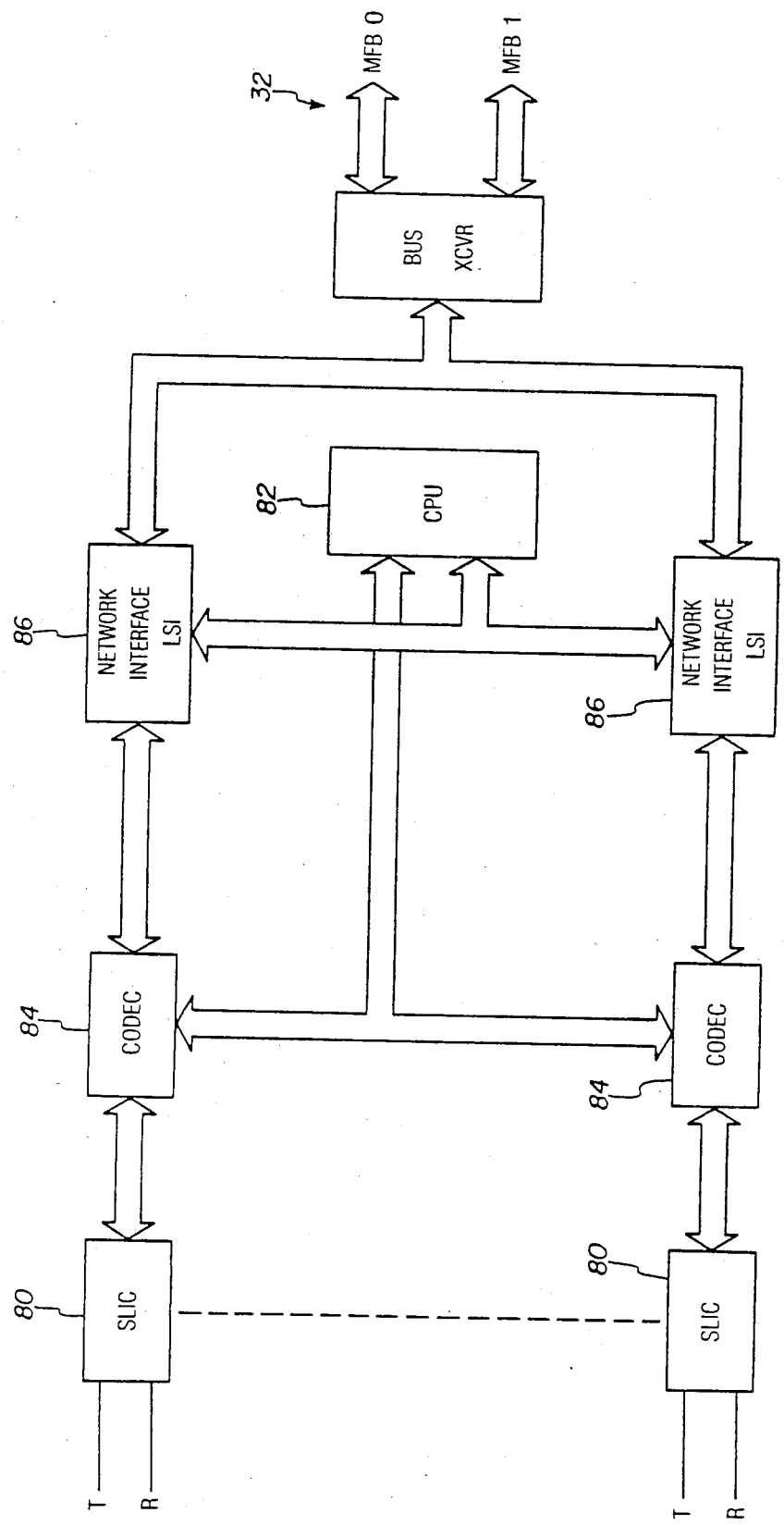
FIG. 13 is a more detailed block diagram of an analog interface.

FIG. 13 shows the major elements of an analog line interface capable of supporting either rotary or DTMF telephones. The general structure of the interface can also be used for analog trunk circuits either two-wire or four-wire. The difference between these interfaces is replacing the SLIC 80 with either a hybrid transformer or a four-wire interface in the associated signaling circuitry and interfaces to the on-board processor 82.

Each analog interface circuit is equipped with a mono-chip 84 which provides the pulse code modulated encoding, decoding and filtering. The network interface LSI 86 has the ability to accept PCM inputs from the serial T1 channels, as well as parallel time slots, to include both local and remote subscribers in three-way connections.

Common to analog interfaces is DC signaling. Depending on the particular interface, the type of signaling is variable. Additionally, signaling varies between line vs. trunk interfaces. The signal interface represents the simplest form of DC signaling. On-off hook is determined by the detection of the loop current. The on-board processor 82 is conditioned to sense the on-hook/off-hook status of the individual lines, convert the status to a high level command message for communications to the concentrator CPU. The interface on-board processor 82 has the ability to time the duration of the loop current breaks to determine flashes and disconnects. These events are also encoded to high level messages for communication to the concentrator CPU. Downward signaling from the concentrator CPU to the analog interface supporting subscriber lines includes ring, ring-trip, and release. These high level commands are interpreted by the interface on-board processor which then controls the appropriate line interface circuit to effect the command. Subscriber instruments employing rotary dialing require the on-board processor 82 to collect the dialed digits and forward at a high level command message the received digits. DTMF digits are collected by a DTMF receiver which is switch connected to the line upon seizure.

Analog trunks employing DC signaling, and either forms of loop signaling or E&M signaling are served by the trunk interface on-board processor. All of the real-time signaling is handled locally on the interface. This includes detection and application of stop dial, wink start, and reverse battery signal commonly used on analog trunk facilities. The trunk interface on-board processor is conditioned to recognize these various signals and convert them to a set of command messages for communicating trunk port status to the concentrator CPU.

Figure 14:
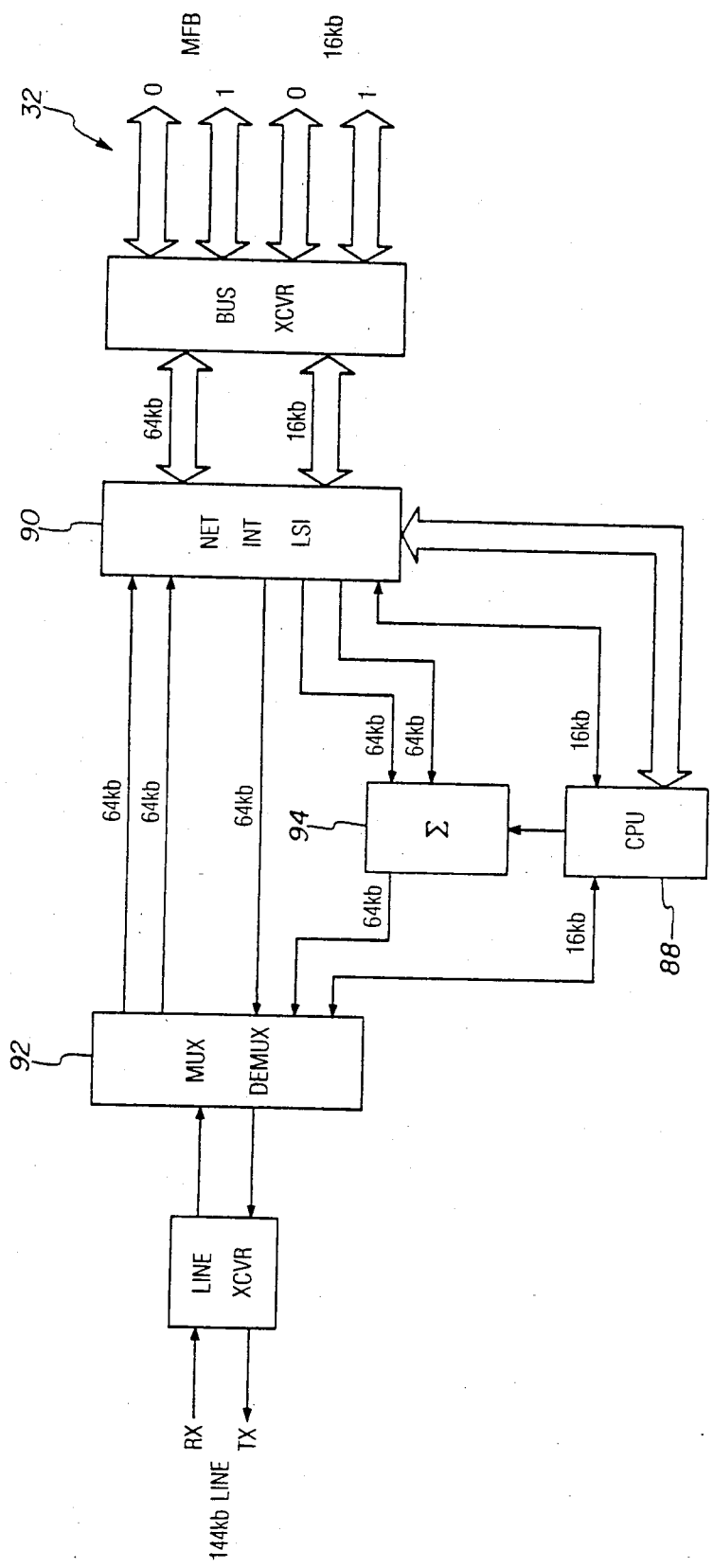
FIG. 14 is a more detailed block diagram of a digital interface.

FIG. 14 depicts the major elements of a digital interface. This interface is capable of supporting a variety of digital user terminals from telephone to user work stations. The line bit rate is 144 kb. This provides combined voice, high speed data, and a 16 kb control of packet data facility. The use of this interface is altered by the specific firmward provided to the on-board processor 88. The on-board processor 88 is linked to the network interface LSI 90 which provides the bi-directional access between the on-board processor 88 and the multi-function bus 32. All of the necessary signaling and control to the user port is handled by the on-board processor 88.

Signaling on the digital interfaces is represented by encoded messages from the user terminal. These messages are received on the 64 kb channel which is de-multiplexed by multiplexer/de-multiplexer 92 from the 144 kb bitstream. The encoded message is collected at the on-board processor 88 and converted to a high level command message for communicating to the concentrator CPU. Included in the encoded message format from the user instrument are on-hook/off-hook, special function keys, DTMF digital keys, and control characters from appended user terminals. All of these encoded commands are translated into digital interface by the on-board processor 88 and re-encoded into the standard control command format for communicating with the concentrator CPU.

In order to maintain the independence of the two 64 kb facilities to the user, and still provide for three-way calling, it is necessary to provide a means 94 of digitally summing the two received pulse code modulated samples and outputting the resultant signal on the voice dedicated 64 kb channel. A pulse code modulated summation circuit 94 is provided on the digital interface which is used on all of the supported circuits. This circuit 94 is equipped with sufficient buffers to temporarily store the received pulse code modulated samples for each of the served ports on the digital interface. The summation circuit 94 is then multiplexed by means 92 among the individual circuits to be summed. The resulting output of the summation process is steered to the appropriate port for transmission to the user terminal. The digital transmission format from the digital interface to the subscriber instrument uses alternate mark inversion.

Figure 15:
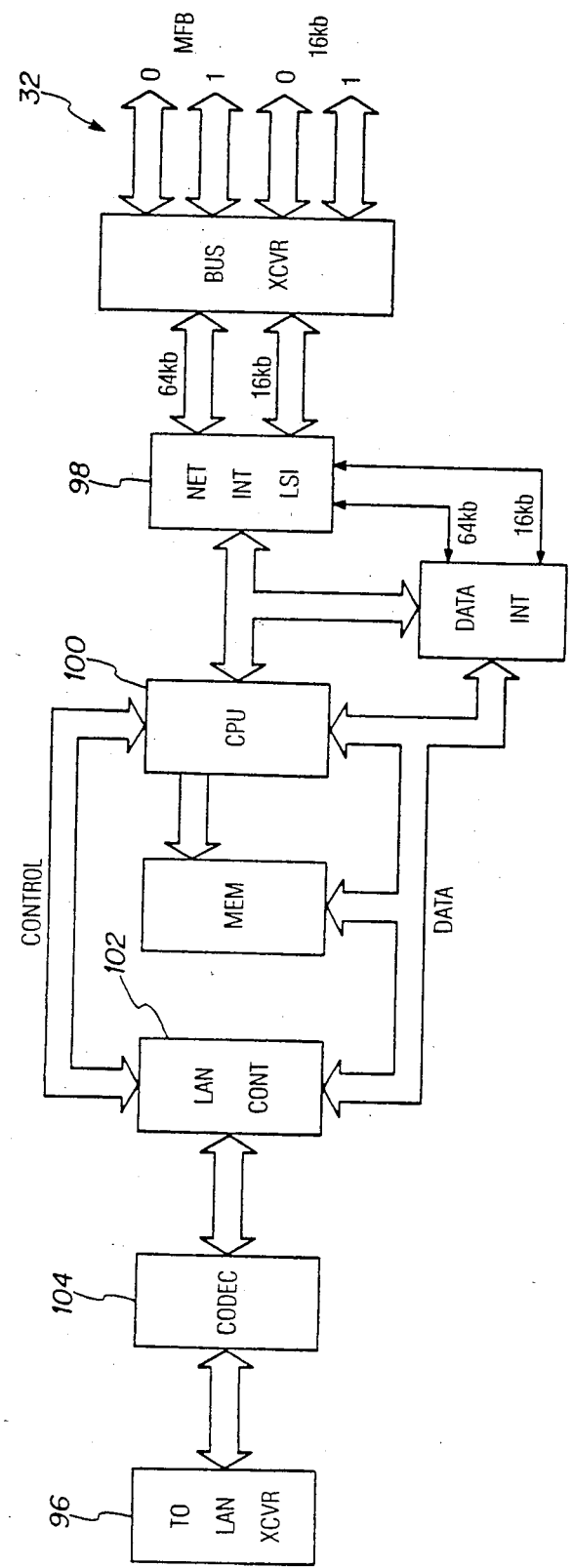
FIG. 15 is a more detailed block diagram of a local area network.
Figure 16:
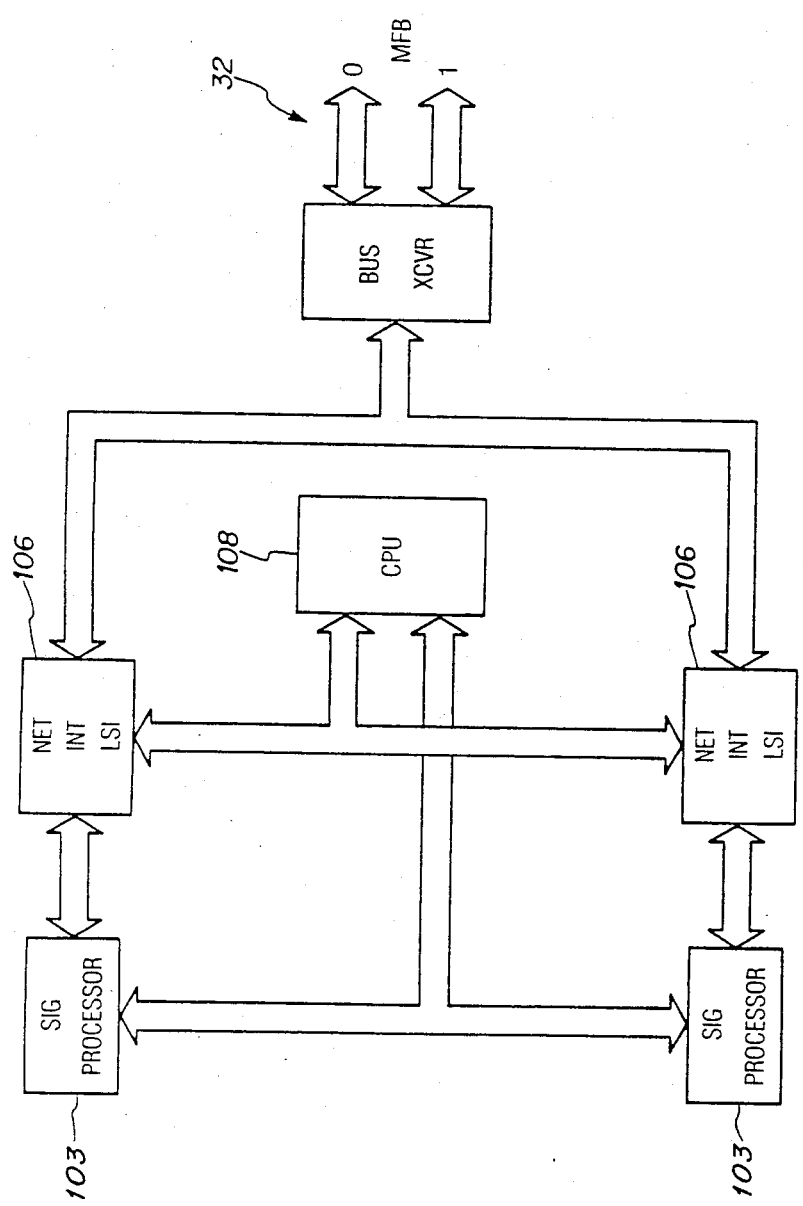
FIG. 16 is a more detailed block diagram of a register interface.

FIG. 15 depicts an interface which supports an external access to a local area network (LAN) 96 such as Ethernet. This interface includes a network interface LSI 98, an on-board processor 100, and up to four LAN controllers 102 and associated encoders/decoders 104. The ability of the concentrator to switch variable bandwidths allows the interface to the LAN controller 102 to be adjusted to the desired data transfer rate from 16 kb to 1.536 mb. Each LAN controller 102 is interfaced via DMA to the on-board procesor 10. The on-board processor 100 provides all of the necessary protocols for the particular LAN 96 being serviced as well as providing simple protocol conversions which may be required to allow any particular subscriber's terminal to be compatible. Service circuit interfaces such as tone senders and receivers, voice synthesizers, and all progress tone sources are shown in FIG. 16. Each interface is equipped with a network interface LSI 106 for access to the multi-function bus 32. The multi-function bus 32 provides the network channels and time slot for the transmission and reception of tone signals as required on a per connection basis. Control information to and from the concentrator CPU is also exchanged by the multi-function bus 32.

The tone receivers utilize digital signal processors 103 which are preprogrammed with firmware to perform detection of multi-frequency or dial tone multi-frequency signals directly from the pulse code modulated samples received. Tone signaling and call progress tones are provided from read only memory which contain pre-digitized information for generating the various call progress tones required in the concentrator. For senderized applications, a full set of MF, or DTMF tones are provided. In addition, call progress tones such as dial tone, busy tone, ring-back tone, re-order tone, and various other special tones for clamp on, call waiting, attendant entry, etc. are provided. The tones are assigned to any available channel or time slot appearing on the multi-function bus 32. The concentrator CPU 108 assigns the appropriate tone to the connection by writing the connection information into the network interfaces LSI 106 associated with the service circuit interface.

The network interface LSI is the key element in providing the connection flexibility of the multi-function bus 32. The LSI device provides all of the circuitry necessary to perform the switching and control functions for each of the various interfaces which are connected to multi-function bus 32. The multi-function bus 32 supports real-time switching for 96 duplex T1 channels on a serial basis and 192 simplex time slots parallel formatted pulse code modulated. The parallel bus is produced by bit rate multiplexing the frame rate of the eight busses formed by the direct termination of the four T1 circuits. Each parallel time slot is capable of transporting 64 kb of information. The effective available bandwidth to each port on the multi-function bus is 4×1.536 mb+192×64 kb or 18.432 mb. This bandwidth is usable for voice or high speed data with future possibilities for transporting full motion video. In addition to the 192 64 kb time slots, the multi-function bus is provided with 192 full duplex 16 kb time slots. This facility is used for packet data transport between user ports. The packet bus is formed by appending two additional busses to the multi-function bus and again bit rate multiplexing the frame rate into 192 full duplex time slots.

The network interface LSI provides two serial transmit and three serial receive ports, two parallel transmit and four parallel receive ports, and an eight bit parallel control port to an adjunct processor, full duplex access to the 16 kb packet data transport time slots, connection memory capacity for segmented four fit interface to accommodate 32 kb compressed voice transmission, connection memory capacity for multiple channels and time slots to send the connection bandwidth to 1.536 mb, on-board counters and logic for timing and connection selection, and strappable address input for control identity. The two serial transmit ports allow the interface to access simultaneously two serial channels on the multi-function bus. Each channel has independent bandwidth control which allows the user to transmit from 32 kb up to 1.536 mb independently on each channel. Three serial receive ports provide for independent voice and data channels. The inclusion of the third port allows for three-way voice connection simultaneously with high speed data reception.

The same attributes are available on the parallel ports. One additional port is provided to accommodate the independent access to the multi-function bus control time slot.

The user interface side of the LSI is equipped with an eight bit parallel port which allows read and write access to the LSI from an adjunct processor. This port is used for the transfer of control information to and from the multi-function bus via the LSI. Appended to the eight bit port are the appropriate control signals to the adjunct processor. The adjunct processor views this port as memory mapped I/O and is conditioned to look at this port routinely either by interrupt or scanning.

The network interface LSI also provides a full duplex access to the 16 kb packet data transport. The LSI has on-board selection of one of 192 16 kb time slots from the extended multi-function bus. This facility is intended to carry user packet data between the interface and the optional PAD module. The use of the 16 kb full duplex facility provides a quick response in connection set up capability for up to 192 user ports.

The network interface LSI is provided with multi-connection memories which store the appropriate time slot channel information used in establishing voice or data connections. Each channel and time slot is segmented as a four bit or 32 kb channel. The selection of bandwidth can be made in 32 kb segments from a single 32 kb facility up to a maximum of 1.536 mb. The connection memory requires the bit to be set in each channel or time slot location that is to be strobed from input or output. This data is written into the LSI device from the adjunct processor in conjunction with the system processor.

The network interface LSI includes a set of counters and decoders for generating the appropriate clock signals and strobes for input and output of information to and from the multi-function bus. Depending on the bandwidth of the chosen connection, the LSI controller selects and gates the proper clock signals to input and output circuits. The LSI is provided with address straps which are used to select the identity of the individual circuits. An adjunct processor uses the strapped identity for communicating with the LSI.

Figure 17:
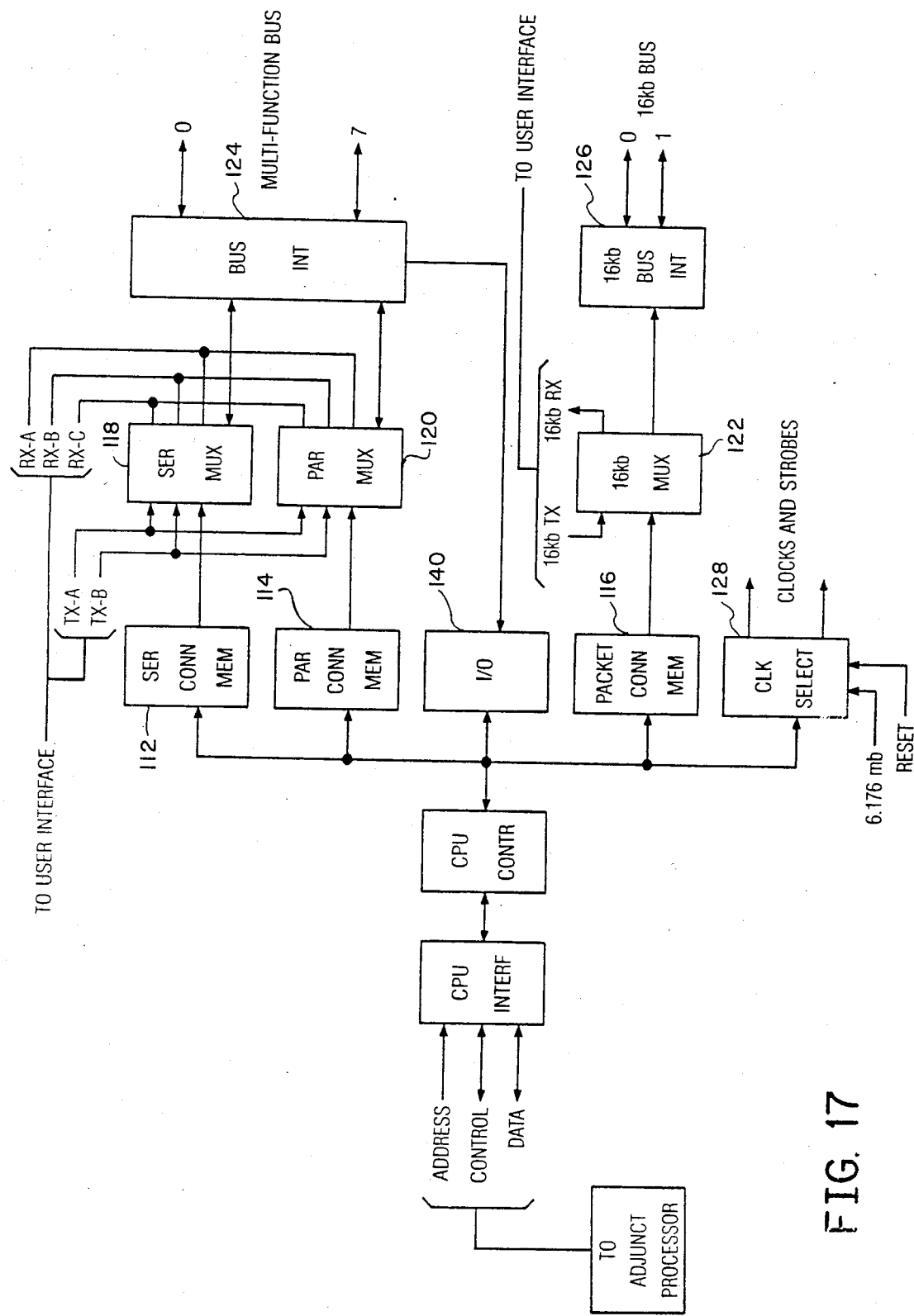
FIG. 17 is a more detailed block diagram of the network interface LSI.
Figure 18:
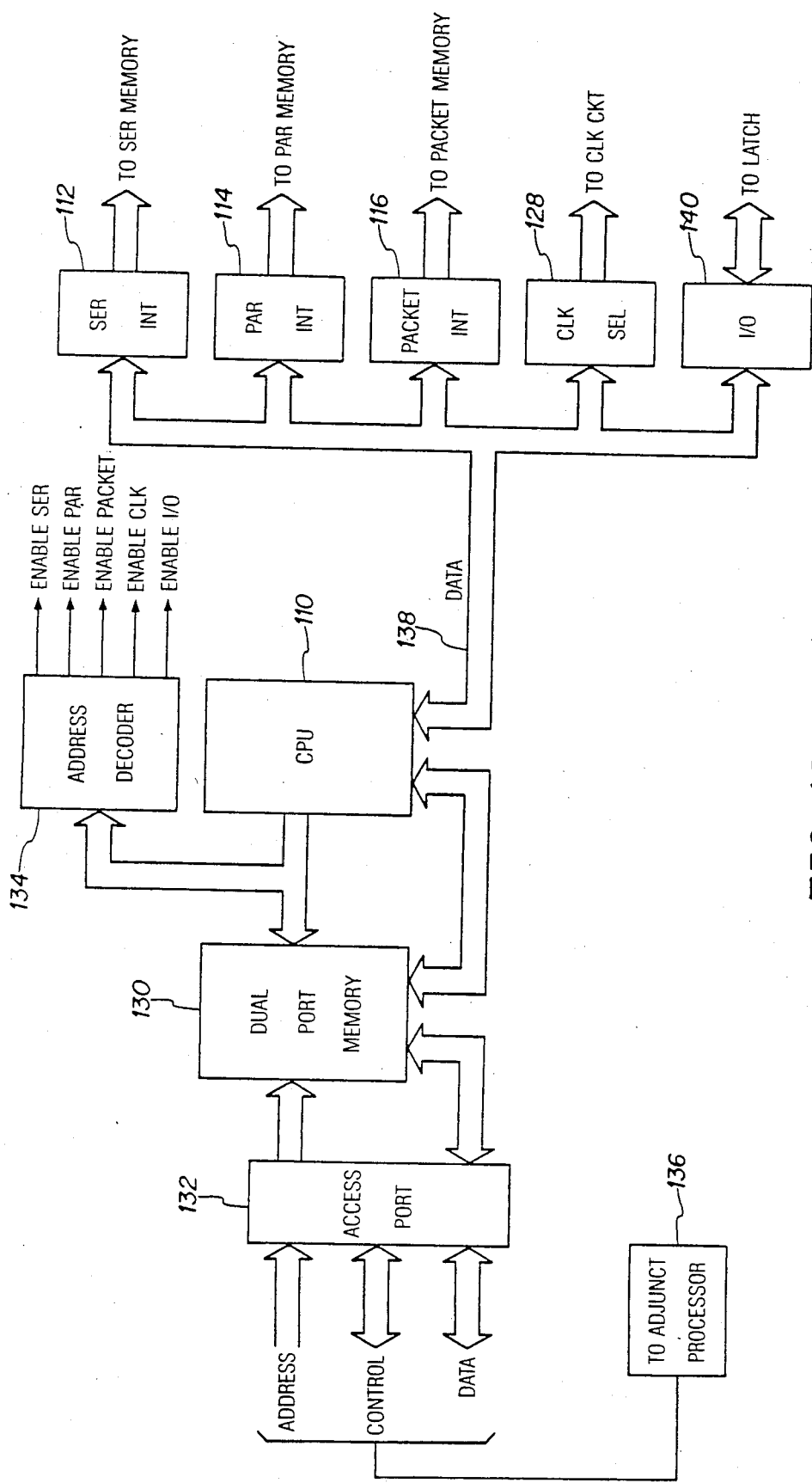
FIGS. 18-23 are more detailed block diagrams of portions of the network interface LSI.

FIG. 17 is a functional block diagram of a network interface LSI, while FIG. 18 depicts the major elements more specifically. The major elements of the device are the internal processor 110, the serial connection memory 112, the parallel connection memory 114, the packet connection memory 116, the clock interface 128, and the associated multiplexers 118, 120, 122 and bus interfaces 124 and 126. The internal processor 110 is combined with the dual-ported memory interface 130, which provides the communications line to the adjunct processor port 132 and with the decoder means 134 and CPU 110 linked interface circuits.

Connection and bandwidth information received from the adjunct processor 136 is formatted by the CPU 110 and outputted on a data bus 138 to the respective interface in conjunction with decoded enable signals from the address decoder 134. The connection information is handled by the interface for subsequent writing to the selected connection memory, and the bandwidth information is processed by the clock interface 128 for selecting the proper clock frequency. The I/O port 140 is used to inteface the control time slot from the multi-function bus 32. This interface 140 is bi-directional and is assigned to send and receive data under control of the CPU 110.

Figure 19:
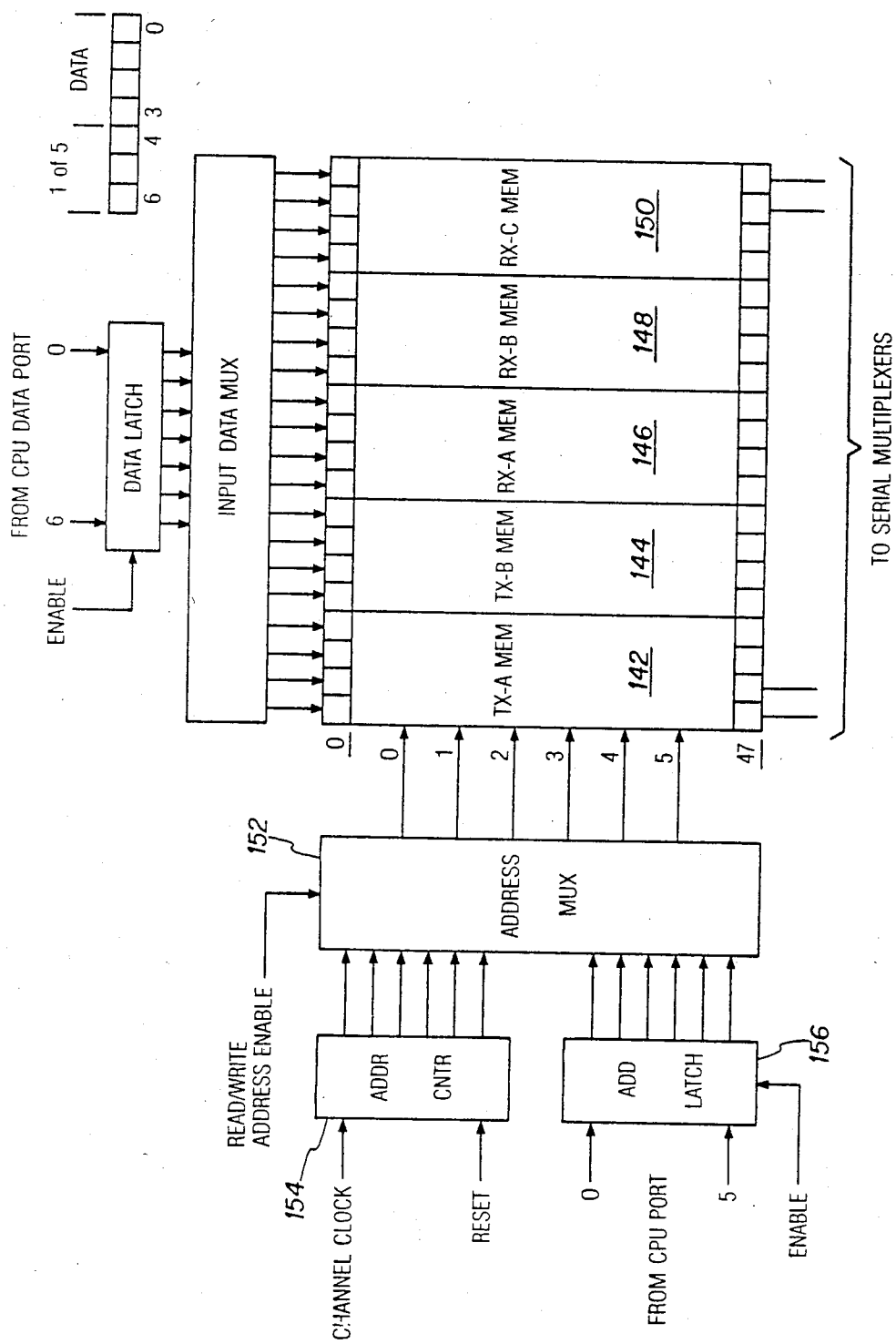

FIG. 19 depicts the serial data connection memory 112. The memory is segmented into five areas 142, 144, 146, 148, and 150 which allow selection of two serial transmit channels TX-A, TX-B ad three serial receive channels RX-A, RX-B, RX-C. The memory 112 addresses locations which correspond to the 48 32 kb channels that are available on each of the four busses of the multi-function bus 32. Each of the five memory segments contains four bit locations which correspond to the respective four transmit and four receive busses on the multi-function bus 32. The address multiplexer 152 allows for read and write access to the memory 112. In the read mode, the memory 112 is addressed sequentially by the address counter 154. In the write mode, the memory 112 is randomly written to the selected address as directed from the contents of the address latch 156. The data written to the connection memory 112 is received from the CPU serial network interface circuit in the format as shown. The high order bits select one of five segments of the memory and the four low order bits contain the data of the bus to be selected.

Figure 20:
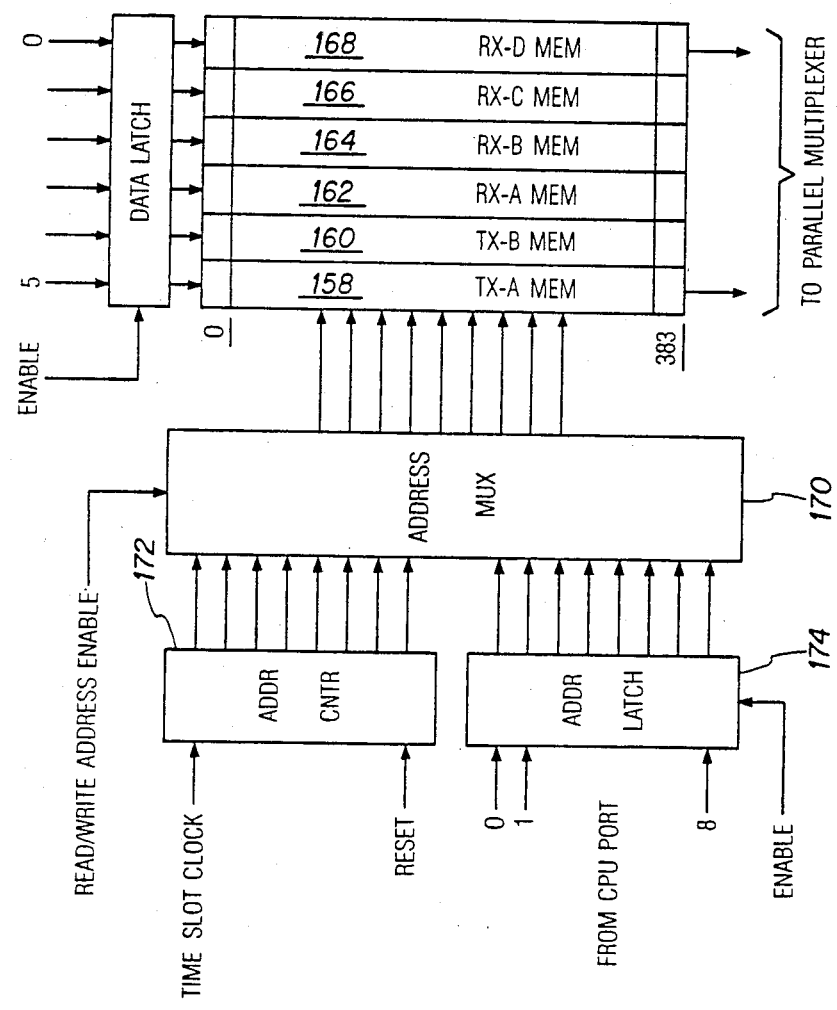

FIG. 20 shows parallel interface connection memory 114. Its function is similar to the serial interface memory connection 112; however, the memory 114 is sized differently. The parallel 114 has six areas 158, 160, 162, 164, 166, and 168. It also has 384 locations. The six areas provide two transmit line slot accesses TX-A, TX-B, and four receive time slots accesses RX-A, RX-B, RX-C, and RX-D. The two transmit time slots provide for simultaneous voice and data connections and the four receive time slots provide for data and simultaneous three-way voice with the fourth time slot being the control port for the multi-function bus 32. The read and write modes of the parallel connection memory 114 are the same as described for the serial memory 112 except that the data does not require a front end multiplexer. The parallel connection memory means 114 has an address multiplexer 170 and address counter 172 and an address latch 174.

Figure 21:
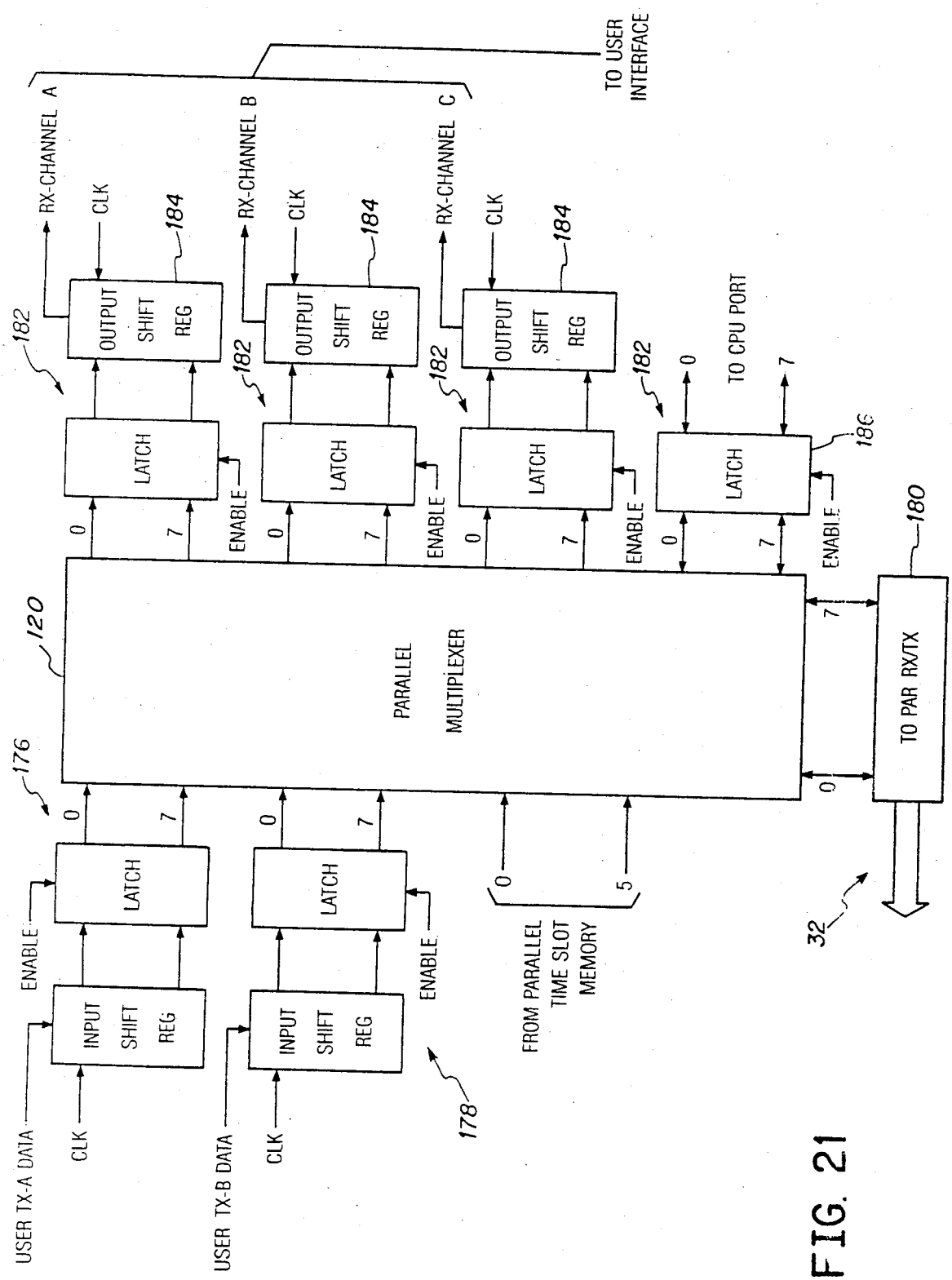
Figure 22:
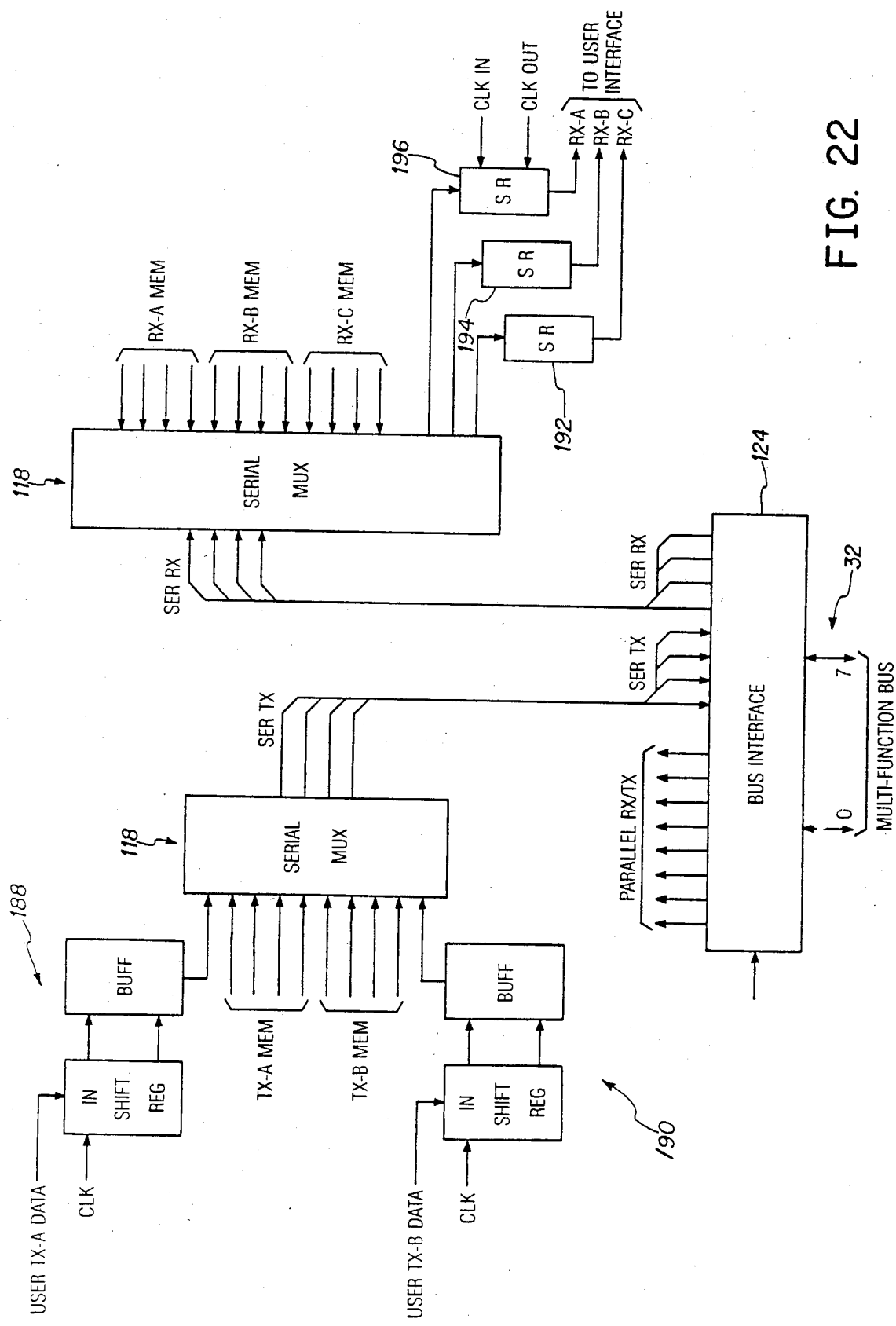

The outputs of both the serial connection memory 112 and 114 are provided as inputs to a set of multiplexers 118 and 120 as shown in more detail in FIGS. 21 and 22. FIG. 21 shows the parallel multiplexer 120 with its two input ports TX-A and TX-B and four output ports RX-A, RX-B, RX-C, RX-D. The data from the parallel connection memory 114 controls the multiplexer 120 to select the specific time slot of the multi-function bus 32 to which that information is to be gated. The transmit ports are buffered with shift register and latch combinations 176, 178 for inputting user data into the multiplexer 120. Output to the multi-function bus 32 is by means of the bus interface 180. The shift register clocks are controlled from the clock select circuit 128 which set the clock at the required speed for the connection bandwidth. The four parallel receive ports RX-A, RX-B, RX-C, and RX-D are all equipped with buffers 182. The three user access receive ports RX-A, RX-B, RX-C are provided with shift registers 184 for interfacing to the external environment. The control port latch 186 is bi-directional allowing control data to be read from and written to the multi-function bus 32. The output of the parallel multiplexer 120 is connected to the bus interface circuits 124 which is provided with the transmit/receive and serial/parallel strobes on the clock circuit 128. The transmit/receive strobe performs the bit division of the extended multi-function bus 32 to affect the full input capability for the 16 kb packet data transport. The serial/parallel strobe splits the bit period of the multi-function bus 32 into the serial access and parallel access periods.

The serial multiplexers 118, as shown in FIG. 22, are the output of the serial data connection memory to control the multiplexing of the channel information being sent and received by the multi-function bus 32. The data from the multi-function bus 32 is taken from the bus at 1.544 mb rate. Depending on the bandwidth of the connection, the clock speed of the serial buffer shift registers 188, 190, 192, 194, and 196 is adjusted to accommodate the speed change. The output of the serial multiplexer 118 are connected to the bus interface 124 which provides the access and timing to the multi-function bus 32.

Figure 23:
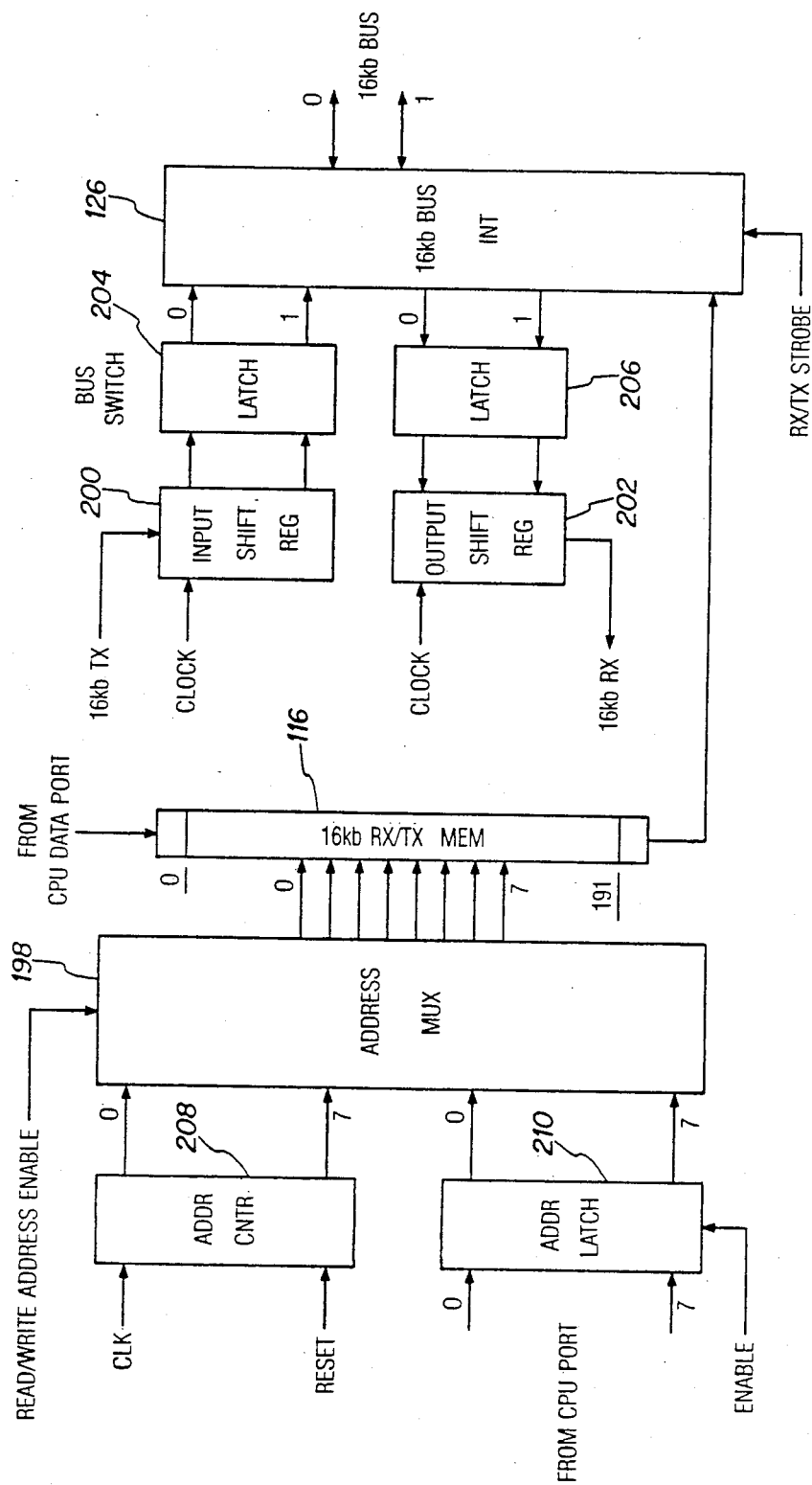

FIG. 23 shows the 16 kb packet data subsystem of the LSI device. The packet data connection memory 116 is one bit wide by 192 locations representing the 192 16 kb time slots appearing on the extended multi-function bus 32. Read and write access to the packet connection memory 116 is under control of the address multiplexer 198. The data entered into the memory 116 is a single bit in the appropriate address location corresponding to the selected 16 kb time slot to be used for packet data transport. The external access 16 kb facility is via buffered shift registers 200, 202 and latches 204, 206 to accommodate the speed change and accumulate full data bytes from the two bit packet transport. The output of the packet connected memory 116 interfaces to the bus interface 126 and is used in conjunction with the receive/transmit strobe to communicate with the packet time slot. The address multiplexer 198 is operatively connected to the address counter 208 and the address latch 210.

The invention is not limited to the particular details of the device depicted and other modifications and applications are contemplated. Certain other changes may be made in the above described device without departing from the true spirit and scope of the invention herein involved. It is intended, therefore, that the above subject matter depicted shall be interpreted as illustrative and not in a limiting sense.

What is claimed is:

1. A interface circuit for use in interfacing a user interface device having an adjunct processing unit and transmit and receive lines with a multi-function bus having predetermined channels and control time slots, said interface circuit comprising:
  internal processor means for controlling data flow and operatively connected to said adjunct processing unit through an internal interface means for communicating control, address and data signals;
  serial connection memory means for channel selection operatively connected to said internal processor means;
  I/O port means for interfacing the control time slots on the multi-function bus and operatively connected to said internal processor means;
  multi-function bus interface means for communicating with the channels on the multi-function bus;
  serial multiplexer means for allowing read and write access to said serial connection memory means operatively connected to said serial connection memory means, to the user interface device trasnmit and receive lines, and to said multi-function bus interface;
  parallel multiplexer means for allowing read and write access to a parallel connection memory means and is operatively connected to said parallel connection memory means, to user interface device transmit and receive lines, and to said multi-function bus interface means; and clock means for receiving a predetermined external clock signal and a reset signal for synchronization operatively connected to said internal processor for receiving predetermined clock frequencies and outputting internal clock signals and strobe signals, to said serial connection memory means, said parallel connection memory means, said serial multiplexer means, said parallel multiplexer means and said multi-function bus interface means.

2. The device described in claim 1 wherein said multi-function bus also has extended transmit and receive lines ad wherein said network interface LSI further comprises:

packet connection memory means for time slot selection on the multi-function bus operatively connected to said internal processor;

packet multiplexer means for allowing read and write access to said packet connection memory means operatively connected to said packet memory means;

packet extended interface means for communicating with said extended transmit and receive lines on the multi-function bus operatively connected to said packet multiplexer means.

3. The device described in claim 2 wherein said packet connection memory means, said packet multiplexer means and said packet extended interface means are operatively connected to said clock means.

4. The device described in claim 2 wherein said packet extended interface means comprises:

an interface port for transferring addresses, control and data signals with the adjunct processing unit in the user interface device;

a dual port memory for linking the address, control and data signals from the interface port operatively connected to said internal processor;

an address identification circuit operatively connected to said dual port memory and to said internal processor and presenting enable signals to said serial connection memory means, said parallel connection memory means, said packet connection memory means, said I/O port means and said clock means.

5. The device described in claim 1 wherein said serial connection memory means comprises:

a memory having five areas for selecting, respectively, two serial transmit lines and three serial receive lines of the user interface device, said memory further having a predetermined number of address locations corresponding to the predetermined number of channels in the multi-function bus, said memory operatively connected to said serial multiplexer means;

an address multiplexer operatively connected to said memory to allow for read and write access to said memory areas;

an address counter operatively connected to said address multiplexer and to said internal processor for sequentially addressing and reading said memory;

an address latch operatively connected to said memory and to said internal processor for randomly writing to a selected address in said memory;

an input data latch operatively connected to said internal processor and to an input data multiplexer, said input data multiplexer operatively connected to said memory.

6. The device described in claim 1 wherein said parallel connection memory means comprises:

a memory having six areas for selecting, respectively, two transmit time slots and four receive time slots, said memory further having a predetermined number of address locations, said memory operatively connected to said parallel multiplexer;

an address multiplexer operatively connected to said memory to allow for read and write access to said memory areas;

an address counter operatively connected to said address multiplexer and to said internal processor for sequentially addressing and reading said memory; and an address latch operatively connected to said memory and to said internal processor for randomly writing to a selected address in said memory.

* * * * *